United States Patent
Hara et al.

(10) Patent No.: US 11,247,271 B2
(45) Date of Patent: Feb. 15, 2022

(54) METHOD FOR PRODUCING METAL NANOWIRE

(71) Applicant: SHOWA DENKO K.K., Tokyo (JP)

(72) Inventors: Masanao Hara, Tokyo (JP); Shigeru Yamaki, Tokyo (JP); Hiroshi Uchida, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 182 days.

(21) Appl. No.: 15/764,423

(22) PCT Filed: Sep. 27, 2016

(86) PCT No.: PCT/JP2016/078387
§ 371 (c)(1),
(2) Date: Mar. 29, 2018

(87) PCT Pub. No.: WO2017/057326
PCT Pub. Date: Apr. 6, 2017

(65) Prior Publication Data
US 2018/0281073 A1    Oct. 4, 2018

(30) Foreign Application Priority Data
Sep. 30, 2015 (JP) .............................. JP2015-193288

(51) Int. Cl.
*B22F 9/24* (2006.01)
*B82Y 40/00* (2011.01)
(Continued)

(52) U.S. Cl.
CPC .............. *B22F 9/24* (2013.01); *B22F 1/0044* (2013.01); *B82Y 40/00* (2013.01); *H01B 1/02* (2013.01);
(Continued)

(58) Field of Classification Search
CPC ................................. B22F 9/24; B82Y 40/00
(Continued)

(56) References Cited

U.S. PATENT DOCUMENTS 7,585,349 B2  9/2009  Xia et al.
8,454,721 B2  6/2013  Allemand
(Continued)

FOREIGN PATENT DOCUMENTS

JP  2015-81383 A  4/2015
JP  2015-137370 A  7/2015
(Continued)

OTHER PUBLICATIONS

Notification of Reasons for Refusal dated Oct. 8, 2019 from Japanese Patent Office in counterpart JP Application No. 2017-543414.
(Continued)

*Primary Examiner* — Weiping Zhu
(74) *Attorney, Agent, or Firm* — Sughrue Mion, PLLC

(57) ABSTRACT

A method for producing metal nanowire of small diameter and long length. In the method for producing a metal nanowire, a first solution containing an ionic derivative and a polyol as a solvent are kept at 80-200° C., and a second solution containing a metal salt and a polyol as a solvent is supplied into the first solution so that the ratio between the number of moles of metal atoms in the metal salt supplied in one minute and the total number of moles of halogen atoms in the ionic derivative in the first solution (the number of moles of metal atoms in the metal salt supplied in one minute/the total number of moles of halogen atoms in the ionic derivative) is less than 10. It is preferable that the ionic derivative is a quaternary ammonium halide and the metal salt is silver nitrate.

17 Claims, 36 Drawing Sheets

(51) Int. Cl.
   *B22F 1/00* (2022.01)
   *H01B 1/02* (2006.01)
   *G06F 3/041* (2006.01)

(52) U.S. Cl.
   CPC ....... *B22F 1/0025* (2013.01); *B22F 2009/245* (2013.01); *B22F 2301/255* (2013.01); *G06F 3/041* (2013.01); *G06F 2203/04103* (2013.01); *G06F 2203/04112* (2013.01)

(58) Field of Classification Search
   USPC .......................................................... 75/370
   See application file for complete search history.

(56) References Cited

U.S. PATENT DOCUMENTS 10,099,291 B2 * 10/2018 Suganuma .............. B22F 1/004
   2012/0328469 A1 12/2012 Zhang et al.
   2015/0107412 A1 4/2015 Lee et al.
   2015/0266096 A1 * 9/2015 Hou .......................... B22F 9/24
                                                                  75/370
   2016/0332234 A1 11/2016 Balachandran et al.
   2016/0368049 A1 12/2016 Saito et al.

FOREIGN PATENT DOCUMENTS

WO   2014/074247 A1   5/2014
   WO   2015/133453 A1   9/2015

OTHER PUBLICATIONS

D. Ducamp-Sanguesa et al., "Synthesis and Characterization of Fine and Monodisperse Silver Particles of Uniform Shape", Journal of Solid State Chemistry, 1992, pp. 272-280, 100.
International Search Report for PCT/JP2016/078387, dated Dec. 20, 2016.

* cited by examiner

Abs($\lambda$ 450)/Abs($\lambda$ max)=0.21

Abs($\lambda$ 450)/Abs($\lambda$ max)=0.23

Abs($\lambda$ 450)/Abs($\lambda$ max)=0.18

Abs($\lambda$ 450)/Abs($\lambda$ max)=0.21

Abs($\lambda$ 450)/Abs($\lambda$ max)=0.21

Abs($\lambda$ 450)/Abs($\lambda$ max)=0.29

Abs($\lambda$ 450)/Abs($\lambda$ max)=0.21

Abs($\lambda$ 450)/Abs($\lambda$ max)=0.21

Abs($\lambda$ 450)/Abs($\lambda$ max)=0.24

Abs(λ 450)/Abs(λ max)=0.21

Abs($\lambda$ 450)/Abs($\lambda$ max)=0.42

Abs($\lambda$ 450)/Abs($\lambda$ max)=0.53

METHOD FOR PRODUCING METAL NANOWIRE

CROSS REFERENCE TO RELATED APPLICATIONS

This application is a National Stage of International Application No. PCT/JP2016/078387 filed Sep. 27, 2016, claiming priority based on Japanese Patent Application No. 2015-193288 filed Sep. 30, 2015.

TECHNICAL FIELD

The present disclosure relates to a method for producing silver nanowires.

BACKGROUND ART

Recently, a silver nanowire is drawing attention as a material for a highly transparent and highly conductive thin film capable of substituting for an ITO (Indium Tin Oxide) film used for a transparent electrode of a touch panel, etc. In general, such a silver nanowire is produced by heating a silver compound under the presence of polyvinylpyrrolidone and polyol such as ethylene glycol, etc., (Patent Document 1, Non-Patent Document 1).

Patent Document 2 mentioned below discloses a technology of: mixing a metal salt (silver nitrate), a capping agent such as polyvinylpyrrolidone, etc., a quaternary ammonium chloride, and a reducing agent having two or more hydroxyl groups so that the molar ratio between the quaternary ammonium chloride and the metal salt (quaternary ammonium chloride/metal salt) is 0.001 to 0.1; and heating the mixture to synthesize metal nanowires (silver nanowires).

PRIOR ART

Patent Document

Patent Document 1: U.S. Pat. No. 7,585,349
Patent Document 2: U.S. Pat. No. 8,454,721

Non-Patent Document

Non-patent Document 1: Ducamp-Sanguesa, et al., J. Solid State Chem., 1992, 100, 272

SUMMARY

In general, metal nanowires having a smaller diameter and a longer length is preferable, because a thin film having superior transparency and conductivity can be formed from such metal nanowires.

One of the objectives of the present disclosure is to provide a method for producing thin and long metal nanowires having an average diameter of approximately 10 to 50 nm and an average length of approximately 5 to 50 μm.

In order to attain the above objective, an embodiment of the present disclosure is a method for producing metal nanowires comprising: maintaining a first solution containing an ionic derivative at 80 to 200° C.; and supplying a second solution containing a metal salt to the first solution in a way so that a molar ratio between a total number of moles of halogen atoms of the ionic derivative in the first solution and a number of moles of metal atoms of the metal salt supplied per minute (number of moles of the metal atoms of the metal salt supplied per minute/total number of moles of the halogen atoms of the ionic derivative) is less than 10.

Preferably, as a structure-directing agent, a (co)polymer containing a monomer unit derived from N-vinylpyrrolidone is provided in at least either the first solution or the second solution.

Further, the first solution and/or the second solution contains a polyol as a solvent, and the polyol is a 2- to 6-valent alcohol compound having 2 to 6 carbon atoms.

Preferably, the molar ratio is 0.01 or more.

Preferably, the ionic derivative is a compound from which halogen ions are dissociated when the compound is dissolved in a solvent, and more preferably, the compound from which halogen ions are dissociated comprises a compound from which chloride ions are dissociated.

Further, preferably, the ionic derivative comprises a compound from which chloride ions are dissociated as well as at least one of a compound from which bromide ions are dissociated and a compound from which iodide ions are dissociated, and supposing that (A) represents a total number of moles of chlorine atoms in the compound from which chloride ions are dissociated, and (B) represents a total number of moles of bromine atoms in the compound from which bromide ion are dissociated and iodine atoms in the compound from which iodide ions are dissociated, a molar ratio (A)/(B) is 2 to 8.

Further, preferably, the ionic derivative is either a quaternary ammonium halide or a metal halide.

Further, preferably, the quaternary ammonium halide is an alkyl quaternary ammonium halide having total 4 to 20 carbon atoms in a molecule (four alkyl groups are bound to a nitrogen atom of a quaternary ammonium salt, the alkyl groups being the same or different from each other). At least one of tetramethylammonium chloride, tetramethylammonium bromide, tetraethylammonium chloride, tetraethylammonium bromide, tetrapropylammonium chloride, tetrapropylammonium bromide, tetrabutylammonium chloride, tetrabutylammonium bromide, trimethyloctylammonium chloride, and octyltrimethylammonium bromide is particularly preferable.

Further, preferably, the metal halide is at least one of alkali metal halides, alkali earth metal halides, and halides of metals in groups 3 to 12 of the long-period periodic table.

Further, preferably, the metal salt is at least one of silver nitrate ($AgNO_3$), silver hexafluorophosphate ($AgPF_6$), silver tetrafluoroborate ($AgBF_4$), silver perchlorate ($AgClO_4$), silver chlorate ($AgClO_3$), silver chloride (AgCl), silver bromide (AgBr), silver fluoride (AgF), silver carbonate ($Ag_2CO_3$), silver sulfate ($Ag_2SO_4$), silver acetate ($CH_3COOAg$), and silver trifluoroacetate ($CF_3COOAg$).

Further, preferably, a concentration of the metal salt in the second solution is 0.1 to 2.0 mol/L.

According to the present disclosure, a metal nanowire having a small diameter and a long length can be produced.

ASPECT OF DISCLOSURE

Figure 1:
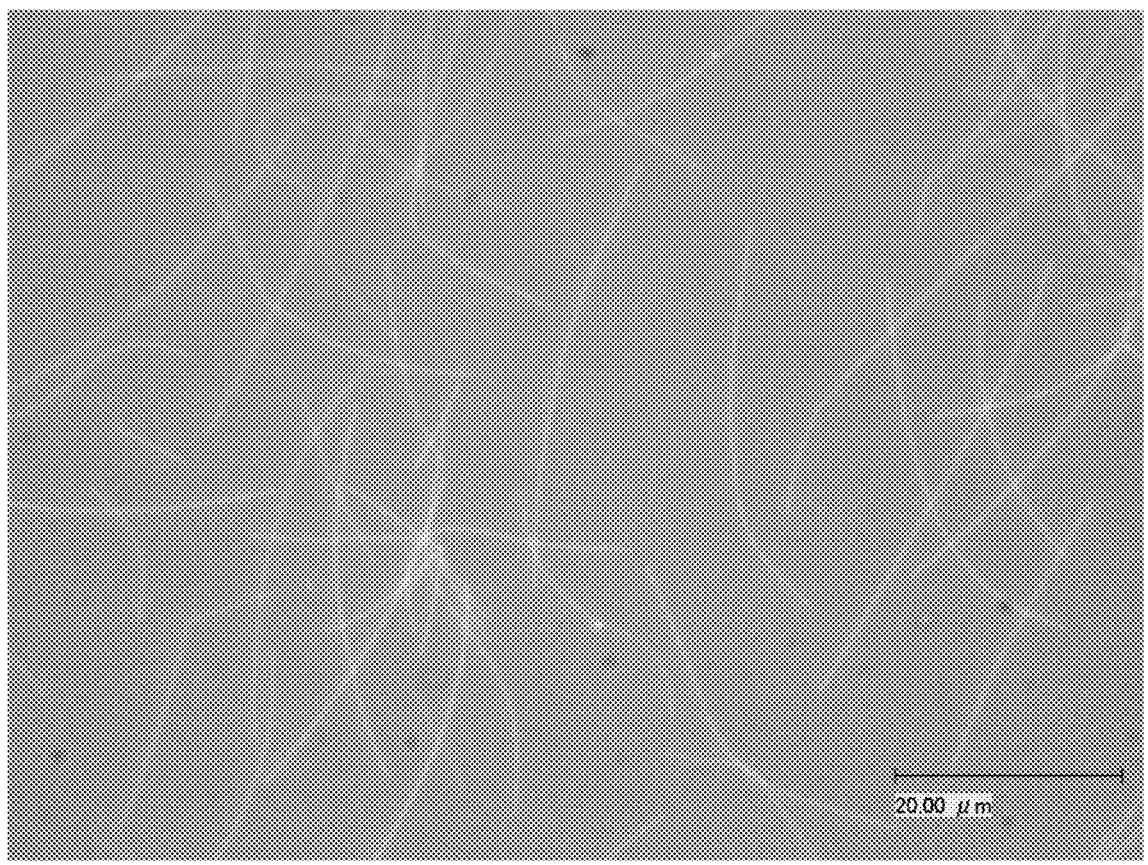
FIG. 1 shows an optical microscope image of silver nanowires obtained by Example 1.

Hereinbelow, an aspect of the present disclosure (hereinbelow, referred to as an aspect) will be explained.

One of the characteristics of a method for producing metal nanowires according to an aspect of the present disclosure is maintaining a first solution containing an ionic derivative at 80 to 200° C., and supplying a second solution containing a metal salt into the first solution, so that a molar ratio between the total number of moles of halogen atoms in of ionic derivative in the first solution and the number of moles of metal atoms of the metal salt to be supplied per minute ((a molar ratio calculated by the number of moles of the metal atoms of the metal salt to be supplied per minute/the total number of moles of the halogen atoms of the ionic derivative), hereinafter, may be referred to as a molar ratio (metal salt/ionic derivative)) is less than 10. Here, the expression "less than 10" includes the case of 0, i.e., the case that the metal salt to be supplied per minute is 0. This means that, during the process of supplying the second solution, there is a time period wherein the amount of metal salt supplied per minute is 0. The second solution may be supplied continuously, or may be supplied intermittently such as by dropping, adding a predetermined amount at a predetermined interval, etc. In a small production scale, a preferable supplying method is dropping, whereas in a rather large production scale, a method of continuously supplying small amount or intermittently supplying a somewhat large amount is possible. The concentration of the metal salt in the second solution may be varied within the range that the molar ratio is less than 10.

By making the molar ratio (metal salt/ionic derivative) to less than 10, the concentration of the metal salt (in particular, the concentration right after the addition) in the reaction liquid (first solution) can be suppressed from being increased, and as a result, metal nanowires having a small diameter and a long length can be produced. Here, the metal nanowire is a metal nanofiber having a diameter in the order of nanometer.

Preferably, the molar ratio (metal salt/ionic derivative) is 0.01 or more. If the molar ratio is less than 0.01, the metal salt supplying speed becomes small, and thereby, the reaction time is extended. The molar ratio (metal salt/ionic derivative) is more preferably in the range from 0.02 to 10, still more preferably from 0.05 to 9, and particularly preferably from 0.1 to 8.5.

The concentration of the metal salt in the reaction liquid (first solution) is measured at an appropriate time during the reaction, by potentiometry, etc., using an oxidation-reduction potentiometer. Preferably, the second solution is added to the first solution while confirming that the molar ratio between the total number of moles of the halogen atoms of the ionic derivative in the reaction liquid (first solution) and the number of moles of the metal atoms in the metal salt (the number of moles of the metal atoms in the metal salt/the total number of moles of the halogen atoms of the ionic derivative), is within the above mentioned molar ratio (metal salt/ionic derivative).

While the metal salt is added, the temperature (reaction temperature) of the first solution is maintained within the range from 80 to 200° C., and more preferably, from 100° C. to 180° C. If the reaction temperature is lower than 80° C., the wire forming reaction progresses slower, and the productivity becomes worse. If the reaction temperature is higher than 200° C., an increased ratio of side reactions, such as formation of spherical powder, occur, and the yield of the metal nanowires decreases.

Preferably, preparation of the first solution into the reaction container and the reaction (addition of the second solution) are performed under a nitrogen gas atmosphere, because this results in a higher rate of thin metal nanowires. The total number of moles of the metal salt supplied from the second solution to the first solution is preferably from 10 to 200 times, and more preferably from 20 to 100 times, of the total number of moles of the halogen atoms of the ionic derivative in the first solution.

The ionic derivative is a component contributing to the growth of the metal wire, and can be any compound as far as halogen ions are dissociated therefrom when the compound is dissolved in a solvent. Quaternary ammonium halides and metal halides are preferable. The halogen ions are preferably at least one of chloride ion, bromide ion, and iodide ion. It is more preferable that the ionic derivative comprises a compound from which chloride ions can be dissociated.

As for the quaternary ammonium halide, an alkyl quaternary ammonium halide having total 4 to 20 carbon atoms (four alkyl groups are bound to a nitrogen atom of a quaternary ammonium salt, the alkyl groups being the same or different from each other) is preferable. For example, quaternary ammonium chlorides, such as tetramethylammonium chloride, tetraethylammonium chloride, tetrapropylammonium chloride, tetrabutylammonium chloride, octyltrimethylammonium chloride, hexadecyltrimethylammonium chloride, etc.; quaternary ammonium bromides, such as tetramethylammonium bromide, tetraethylammonium bromide, tetrapropylammonium bromide, tetrabutylammonium bromide, octyltrimethylammonium bromide, hexadecyltrimethylammonium bromide, etc., may be exemplified. One of the exemplified compounds can be used solely, or two or more kinds of compounds can be used in combination. Further, an ammonium salt formed by reacting quaternary ammonium hydroxide with hydrogen chloride, hydrogen bromide, or hydrogen iodide, can be used. These are in gaseous state at a room temperature. Thus, an aqueous solution thereof may be used in a polyol solvent for neutralization, and after the neutralization, the resultant may be heated to distil water and excess hydrogen halides away.

Among them, halide-quaternary alkyl ammonium salts having total 4 to 16 carbon atoms in a molecule is preferable in terms of solubility and efficiency of use. A halide-quaternary alkyl ammonium salt in which the longest alkyl chain bound to a nitrogen atom has 12 or less carbon atoms, and more preferably 8 or less, is preferable in terms of efficiency of use because the molecular weight is not particularly large. From the viewpoint of the shape of the wire to be obtained, tetramethylammonium chloride, tetramethylammonium bromide, tetraethylammonium chloride, tetraethylammonium bromide, tetrapropylammonium chloride, tetrapropylammonium bromide, tetrabutylammonium chloride, tetrabutylammonium bromide, octyltrimethylammonium chloride, and octyltrimethylammonium bromide, are particularly preferable.

As for the metal halide, alkali metal halides, alkali earth metal halides, and halides of metals in 3 to 12 groups of the long-period periodic table, may be exemplified.

As for the alkali metal halides, alkali metal chlorides such as lithium chloride, sodium chloride, potassium chloride, etc.; alkali metal bromides such as sodium bromide, potassium bromide, etc.; and alkali metal iodides such as sodium iodide, potassium iodide, etc., may be exemplified. As for the alkali earth metal halides, magnesium chloride, calcium chloride, etc., may be exemplified. As for the halides of metals in 3 to 12 groups of the long-period periodic table, ferric chloride, cupric chloride, ferric bromide, cupric bromide, etc., may be exemplified. One of the exemplified compounds can be used solely, or two or more kinds of compounds can be used in combination. Also, a quaternary ammonium salt and a metal halide may be used in combination.

Among them, containing a compound from which chloride ions are dissociated, is appropriate for, in particular, forming wires. Further, in order to obtain a wire having a small diameter, using a compound from which chloride ions are dissociated, in combination with at least one of a compound from which bromide ions are dissociated and a compound from which iodide ions are dissociated, is preferable. Supposing that (A) represents the total number of moles of chlorine atoms in a compound from which chloride ions are dissociated, and (B) represents the total number of moles of bromine atoms in a compound from which bromide ions are dissociated and iodine atoms in a compound from which iodide ions are dissociated, as the molar ratio (A)/(B) increases, the wire has a larger diameter, and as the ratio decreases, the wire has a smaller diameter, with the proviso that when the ratio is too small, the rate of by-product formation, i.e., spherical powder, tends to increase. Accordingly, the molar ratio (A)/(B) is preferably 2 to 8, and more preferably 3 to 6.

As for the metal salt, silver nitrate ($AgNO_3$), silver hexafluorophosphate ($AgPF_6$), silver tetrafluoroborate ($AgBF_4$), silver perchlorate ($AgClO_4$), silver chlorate ($AgClO_3$), silver chloride (AgCl), silver bromide (AgBr), silver fluoride (AgF), silver carbonate ($Ag_2CO_3$), silver sulfate ($Ag_2SO_4$), silver acetate ($CH_3COOAg$), silver trifluoroacetate ($CF_3COOAg$), may be exemplified. From the viewpoints of production efficiency of silver nanowires and availability of an intended silver nanowire shape, silver nitrate, silver perchlorate, silver chlorate, silver fluoride, silver hexafluorophosphate, silver tetrafluoroborate, silver trifluoroacetate, are preferable. Further, from the viewpoint of solubility in the solvent, silver nitrate, silver hexafluorophosphate, silver tetrafluoroborate, silver trifluoroacetate, are more preferable. One of these can be used solely, or two or more kinds of them can be used in combination.

In the second solution, the concentration of the metal salt is preferably 0.1 to 2.0 mol/L. If the concentration is lower than 0.1 mol/L, a larger amount should be added, resulting in worsening the productivity. If the concentration is higher than 2.0 mol/L, variation in silver concentration becomes large at the time of addition, resulting in widening the variation of wire shapes.

Further, preferably, either the first solution or the second solution contains a structure-directing agent. The structure-directing agent functions as a capping agent at the synthesis process of metal nanowires. The capping agent is a substance (ion, surfactant, etc.) which sticks to a specific plane of a nucleus to be generated, suppresses the growing speed of the plane, and controls the shape of a particle to be generated. In case of a silver nanowire, a long and thin nanowire can be obtained by selecting a capping agent which sticks to the side of the nanowire. For example, general information of the capping agent can be found in the following Nonpatent Document.

Xia, et al. Acc. Chem. Res. 2007, 40, 1067.
Nobuyuki Zettsu, Journal of the Japanese Association for Crystal Growth, 2010, 37, No. 4, 281

As for the capping agent (structure-directing agent), a (co)polymer having a monomer unit derived from N-vinylpyrrolidone, for example, poly-N-vinylpyrrolidone (PVP), a copolymer having N-vinylpyrrolidone and vinyl acetate at the rate of 1:1, etc., may be exemplified. The capping agent has a molecular weight, i.e., a weight average molecular weight, of preferably 10,000 to 1,000,000, and more preferably 20,000 to 600,000. If the weight average molecular weight of the capping agent is less than 10,000, the nanowire structure tends to be particulate, whereas, if the weight average molecular weight exceeds 1,000,000, the wire tends to have a larger diameter.

The weight average molecular weight is measured by GPC (Gel Permeation Chromatography). Specifically, the measurement is performed by RI detection using LC-NetII/ADC manufactured by JASCO Corporation and RI-2031 Plus manufactured by JASCO Corporation. As a column, Shodex OHpak SB-806M HQ is used. The developing solvent is 0.1 M of NaCl solution/acetonitrile=55:45, and the flow rate is 1 mL/min. Using PEO calibration kit manufactured by Agilent Technologies as a reference sample, a weight average molecular weight of the capping agent is obtained.

In addition, preferably, the first solution and/or the second solution contains a polyol as a solvent. The polyol also functions as a reducing agent. The metal salt is reduced by the reducing agent, and the metal is precipitated. Using a compound which functions as both a solvent and a reducing agent, is preferable from the safety and economical point of view.

The polyol is a 2- to 6-valent alcohol compound having 2 to 6 carbon atoms. Specifically, 2-valent alcohol such as ethylene glycol, diethylene glycol, triethylene glycol, polyethylene glycol 200, polyethylene glycol 300, propylene glycol, dipropylene glycol, 1,3-propanediol, 2-methyl 1,3-propanediol, 1,2-butanediol, 1,3-butanediol, 1,4-butanediol, 1,5-pentanediol, 1,6-hexanediol, 1,4-cyclohexanediol, etc.; 3-valent alcohol such as glycerine, etc.; 4-valent alcohol such as pentaerythritol, diglycerine, ditrimethylol propane, etc.; 6-valent alcohol such as sorbitol, etc., may be exemplified. One of the exemplified compounds can be used solely, or two or more kinds of the compounds can be used in combination. The 2- to 6-valent alcohol compound having 2 to 6 carbon atoms is preferable in the point that the boiling point is high and thus, the temperature thereof can be raised at normal pressure, and the point that the reduction property is superior. If the polyol is used as a solvent, a reducing agent is not required additionally.

Among the above polyols, 2-valent alcohols are more preferable because the viscosities are not high. Among the 2-valent alcohols, ethylene glycol and propylene glycol are particularly preferable, from the economical point of view.

The total amount of the polyol to be used is not particularly limited, but normally 10,000 to 100,000 parts by mass, and preferably 15,000 to 60,000 parts by mass, relative to 100 parts by mass of the metal salt. If the amount is less than this range, the reduction speed tends to slow, and if the amount is more than this range, the productivity tends to be worse.

In addition, a solvent which does not provide adverse effects to the reaction, such as water, partial or full alkyl ethers of polyols such as ethylene glycol monomethyl ether, ethylene glycol dimethyl ether, propylene glycol monomethyl ether, 3-methoxy 1-butanol, and the like, can be used together with the above polyol.

The metal nanowires generated as above are washed by a centrifuge separator. Using the centrifuge separator, the metal nanowires are settled down, separated from the solvent, and thereafter, washed by cleaning solvent, and subjected to another centrifuging to repeat the process. The solvent which can be used for cleaning may be water, methanol, ethanol, isopropyl alcohol, n-propyl alcohol, n-butanol, isobutanol, sec-butanol, etc. Among them, water, methanol, ethanol, and isopropyl alcohol are preferable from the viewpoint of easy industrial availability and easy operability of solvent substitution in the post-process.

The metal nanowires obtained by the above mentioned production method have an average diameter of approximately 10 to 50 nm, an average length of approximately 5 to 50 μm, and stable production of metal nanowires having an average diameter of 10 to 45 nm, and an average length of 15 to 50 μm can be achieved. The diameter and the length of the metal nanowires may be measured in accordance with a method described in Examples below.

Regarding the obtained metal nanowire, ultraviolet and visible absorption spectrum at 300 to 600 nm is measured by a spectrophotometer. Then, the ratio (Abs($\lambda$450)/Abs($\lambda$max)) is obtained, wherein Abs($\lambda$max) is the maximum peak value of absorbance at 370 nm to 380 nm representing a metal nanowire, and Abs($\lambda$450) is an absorbance value at a wavelength of 450 nm representing a spherical metal particle. The ratio (Abs($\lambda$450)/Abs($\lambda$max)) is preferably in the range from 0.1 to 0.5. When no spherical particles are present, this value is approximately 0.1, although the value varies depending on the shape of the metal nanowires. If this value is larger than 0.5, the content of spherical particles is 50% or more, resulting in the decrease of metal nanowire quality.

EXAMPLES

Hereinafter, specific examples of the present disclosure will be explained. The examples are described below for the purpose of easy understanding of the present disclosure, and the present disclosure is not limited to these examples.
<Observation of Metal Nanowire Shape>

With respect to the metal nanowire shape (length, diameter), diameters and the lengths of randomly selected 50 nanowires were observed using the Ultra High Resolution Field-Emission Scanning Electron Microscope SU8020 (accelerating voltage: 3 to 10 kV) manufactured by Hitachi High-Technologies Corporation, and average values thereof were obtained.

Further, using the UV-Visible-Near Infrared spectrophotometer V-670 manufactured by JASCO Corporation, ultraviolet and visible absorption spectrum at 300 to 600 nm was measured, and a ratio (Abs($\lambda$450)/Abs($\lambda$max)) was obtained, wherein Abs($\lambda$max) is the maximum peak value of absorbance at 370 nm to 380 nm caused by metal nanowires, and Abs($\lambda$450) is the absorbance value at the wavelength 450 nm representing metal spherical particles. The lower the ratio, the fewer the spherical particles generated when metal nanowires are synthesized.

<Measurement of Metal Ion Concentration>

Silver ion concentrations were measured by potentiometry using a silver electrode, using Automatic Titrator AUT-301 manufactured by DKK-TOA Corporation.

Example 1

100 g of propylene glycol (manufactured by Wako Pure Chemical Industries, Ltd.) was weighed and charged in a 200 mL glass container, and 2.3 g (13 mmol) of silver nitrate (manufactured by Toyo Chemical Industrial Co., Ltd.), i.e., metal salt was added thereto, which were stirred for 2 hours at a room temperature, and thereby, a silver nitrate solution (second solution) was prepared.

600 g of propylene glycol, 0.052 g (0.32 mmol) of tetraethylammonium chloride (manufactured Lion Specialty Chemicals Co., Ltd) and 0.008 g (0.08 mmol) of sodium bromide (manufactured by Manac Incorporated) as ionic derivatives, and 7.2 g of polyvinylpyrrolidone K-90 (PVP) (manufactured by Wako Pure Chemical Industries, Ltd., weight average molecular weight: 350,000) as a structure-directing agent, were prepared in a 1 L four-neck flask (equipped with mechanical stirrer, dropping funnel, reflux condenser, thermometer, nitrogen-gas inlet tube), under a nitrogen atmosphere, which was stirred at the rotational speed of 200 rpm at the temperature of 150° C. for one hour until the contents were completely dissolved, to thereby obtain the first solution. The previously prepared silver nitrate solution (second solution) was set in the dropping funnel, and was dropped into the first solution at the temperature of 150° C., for 2.5 hours (number of moles of the supplied silver nitrate: 0.087 mmol/min), and thereby, silver nanowires were synthesized. In this case, the molar ratio (metal salt/ionic derivative) calculated between the total number of moles of the halogen atoms of the ionic derivative in the first solution (0.40 mmol) and the number of moles of the silver atoms of the silver nitrate supplied per minute (0.087 mmol), was 0.22. Further, with respect to the silver ion concentration in the first solution during the reaction, the molar ratio between the halogen atoms of the ionic derivative and the metal atoms of the metal salt (the number of moles of the metal atoms of the metal salt/the total number of moles of the halogen atoms of the ionic derivative) was in the range from 0.2 to 6.7. After the dropping was finished, heating and stirring were continued for one hour, and then, the reaction was completed.

The reaction mixture was diluted five times with ethanol, and was subjected to centrifugal force using a centrifuge, at the rotational number of 6000 rpm, for five minutes, to settle down silver nanowires. The operation of adding ethanol and processing at 6000 rpm for five minutes, was repeated twice more, and the PVP and the solvent remaining in the system were washed.

Figure 2:
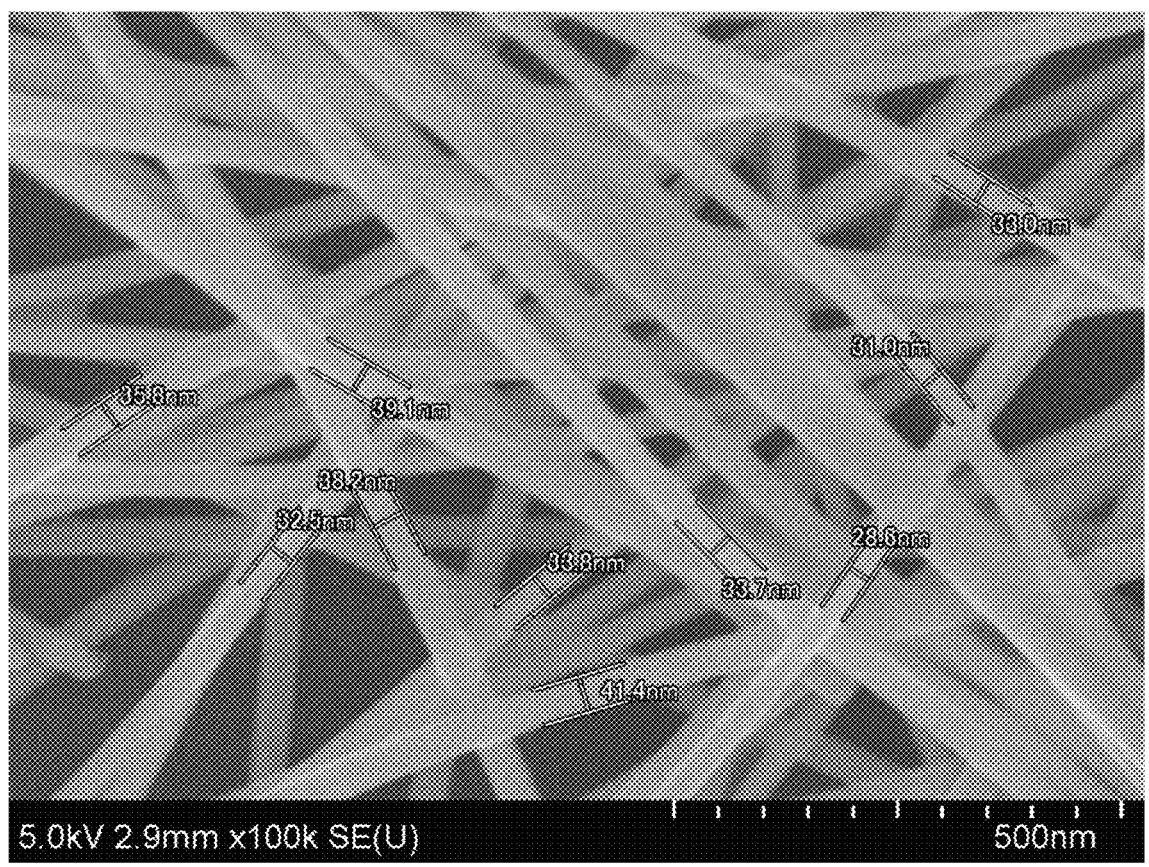
FIG. 2 shows a Field-Emission Scanning Electron Microscope (FE-SEM) image of silver nanowires obtained by Example 1.

FIG. 1 shows an optical microscope image of the obtained silver nanowires. The diameters and the lengths of the obtained silver nanowires were obtained by the above-mentioned method using the Field-Emission Scanning Electron Microscope (FE-SEM) image (FIG. 2), and the average diameter was 36.3 nm and the average length was 25.5 µm.

Figure 3:
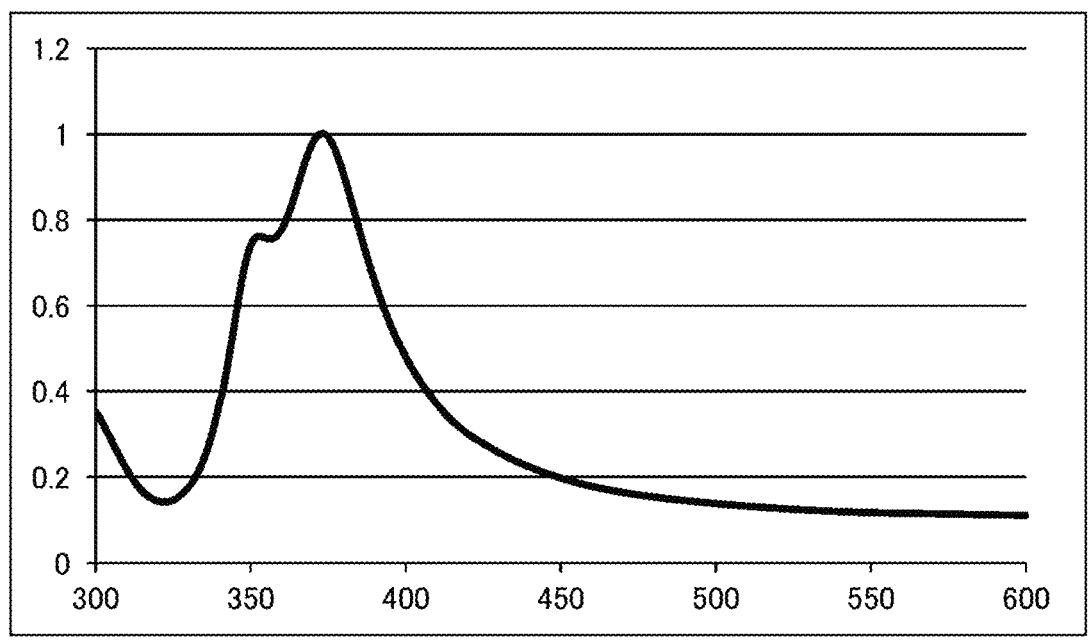
FIG. 3 shows an ultraviolet and visible absorption spectrum of silver nanowires obtained by Example 1.

FIG. 3 shows ultraviolet and visible absorption spectrum of the obtained silver nanowires. The Abs(λ450)/Abs(λmax) obtained from the spectrum of FIG. 3 was 0.21.

Example 2

Silver nanowires were synthesizes and washed by the same operation as Example 1, except that the first solution was prepared by using, as the structure-directing agent, 3.6 g of polyvinylpyrrolidone K-90 (PVP) (manufactured by Wako Pure Chemical Industries, Ltd., weight average molecular weight: 350,000) and 3.6 g of copolymer consisting of vinylpyrrolidone and vinyl acetate in the ratio of 1:1 (PVA-6450, manufactured by Osaka Organic Chemical Industry Ltd., weight average molecular weight: 50,000), instead of 7.2 g of polyvinylpyrrolidone K-90 (PVP) (manufactured by Wako Pure Chemical Industries, Ltd., weight average molecular weight: 350,000).

In this case, the molar ratio (metal salt/ionic derivative) calculated from the total number of moles of the halogen atoms of the ionic derivative (0.40 mmol) and the number of moles of the silver atoms of the silver nitrate supplied per minute (0.087 mmol), was 0.22. Further, when the silver ion concentration in the first solution was measured during the reaction, the molar ratio between the halogen atoms of the ionic derivative and the metal atoms of the metal salt (the number of moles of the metal atoms of the metal salt/the total number of moles of the halogen atoms of the ionic derivative) was in the range from 0.2 to 6.7.

Figure 4:
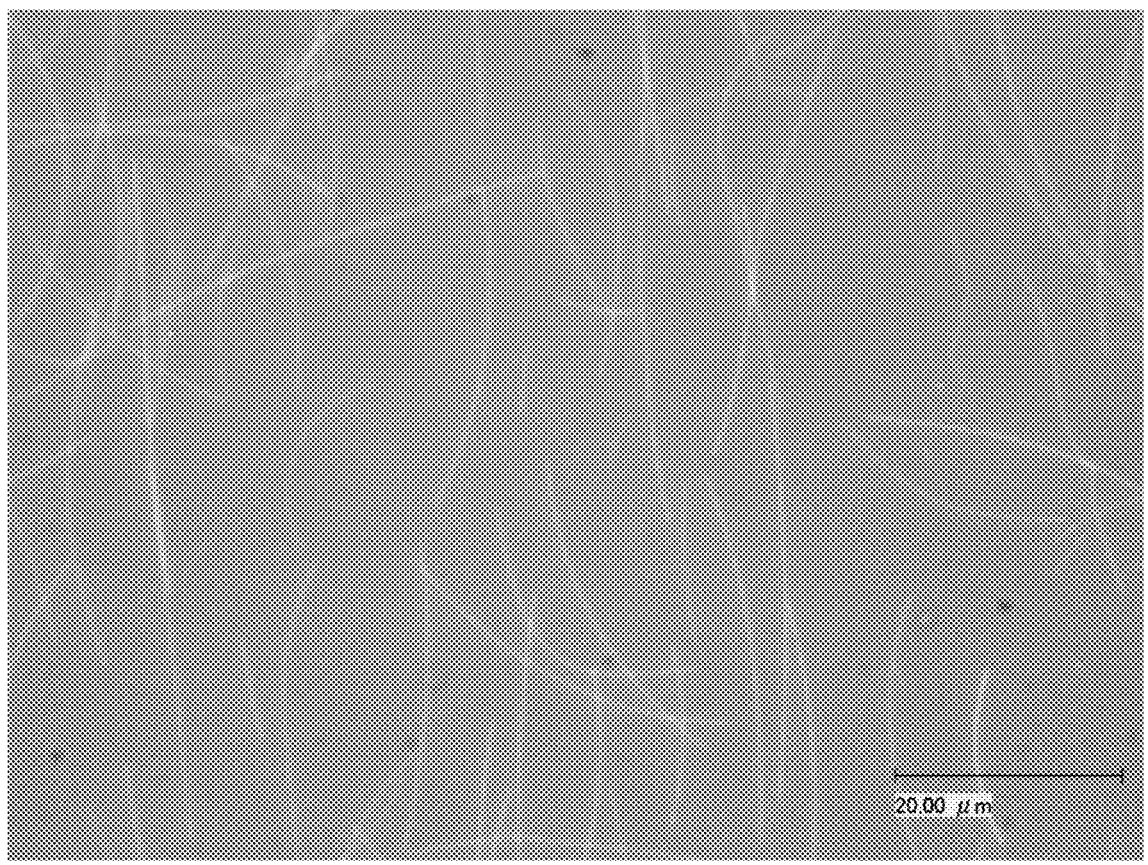
FIG. 4 shows an optical microscope image of silver nanowires obtained by Example 2.
Figure 5:
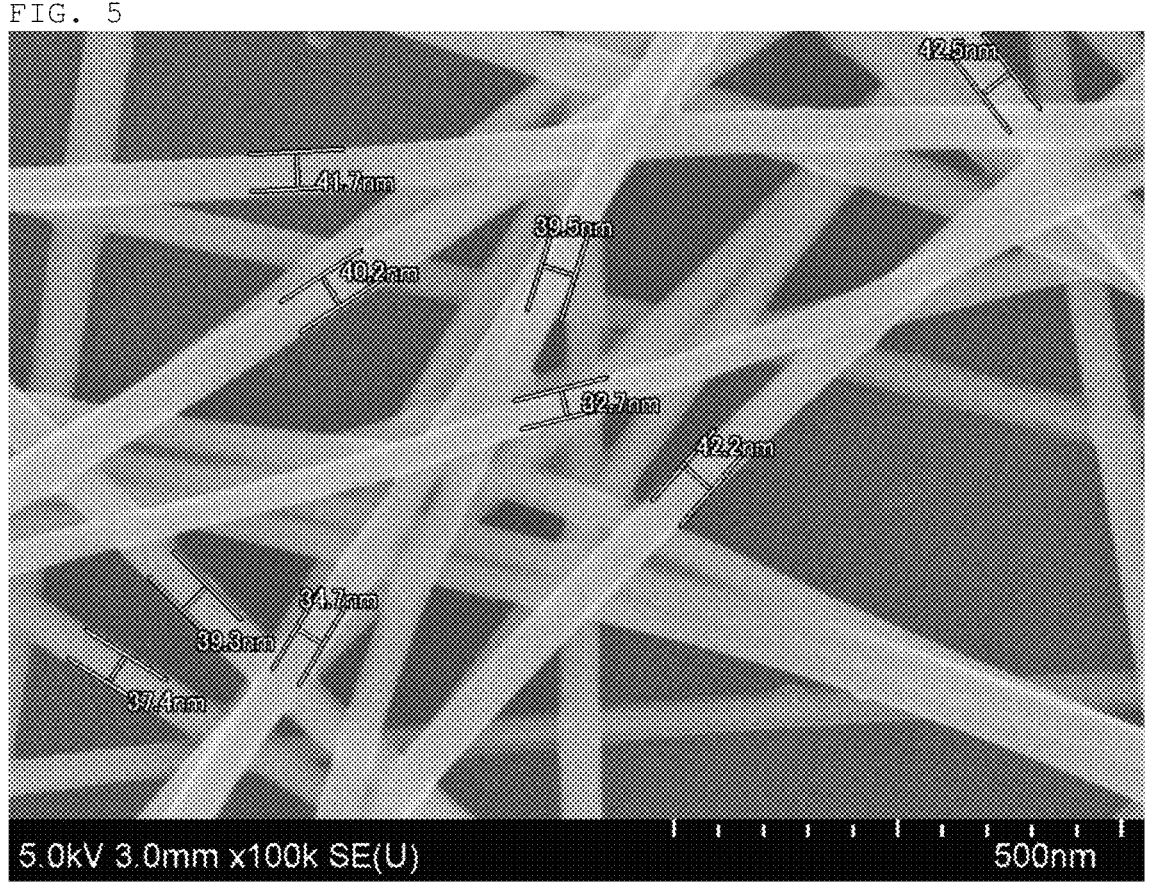
FIG. 5 shows a Field-Emission Scanning Electron Microscope (FE-SEM) image of silver nanowires obtained by Example 2.

FIG. 4 shows an optical microscope image of the obtained silver nanowires. The diameters and the lengths of the obtained silver nanowires were obtained by the above-mentioned method using the Field-Emission Scanning Electron Microscope (FE-SEM) image (FIG. 5), and the average diameter was 41.4 nm and the average length was 26.9 µm.

Figure 6:
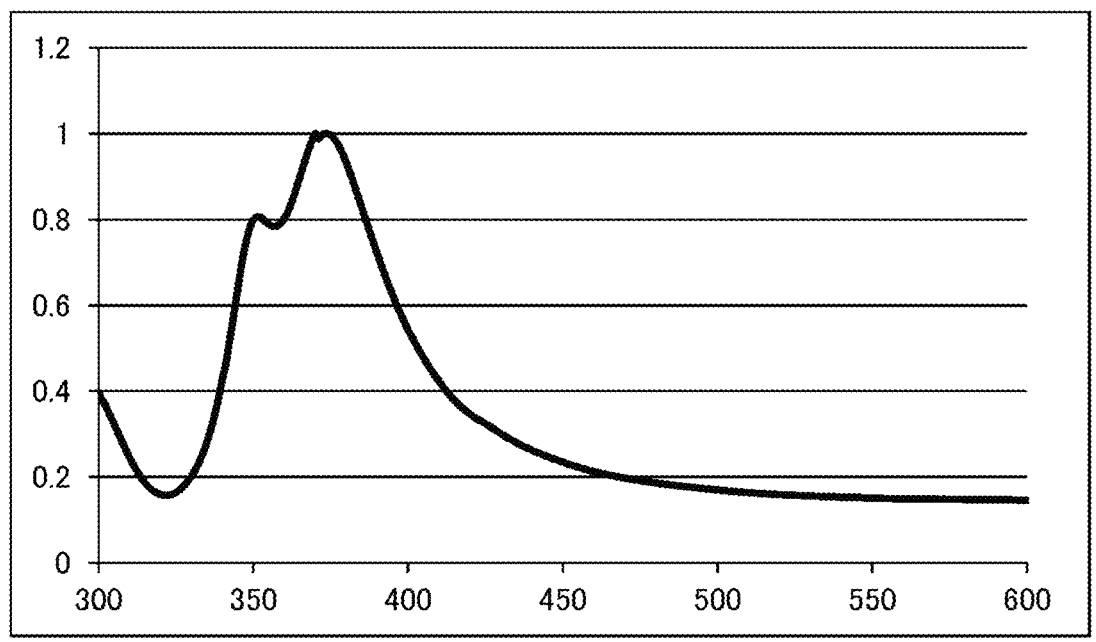
FIG. 6 shows an ultraviolet and visible absorption spectrum of silver nanowires obtained by Example 2.

FIG. 6 shows ultraviolet and visible absorption spectrum of the obtained silver nanowires. The Abs(λ450)/Abs(λmax) obtained from the spectrum of FIG. 6 was 0.23.

Example 3

Figure 7:
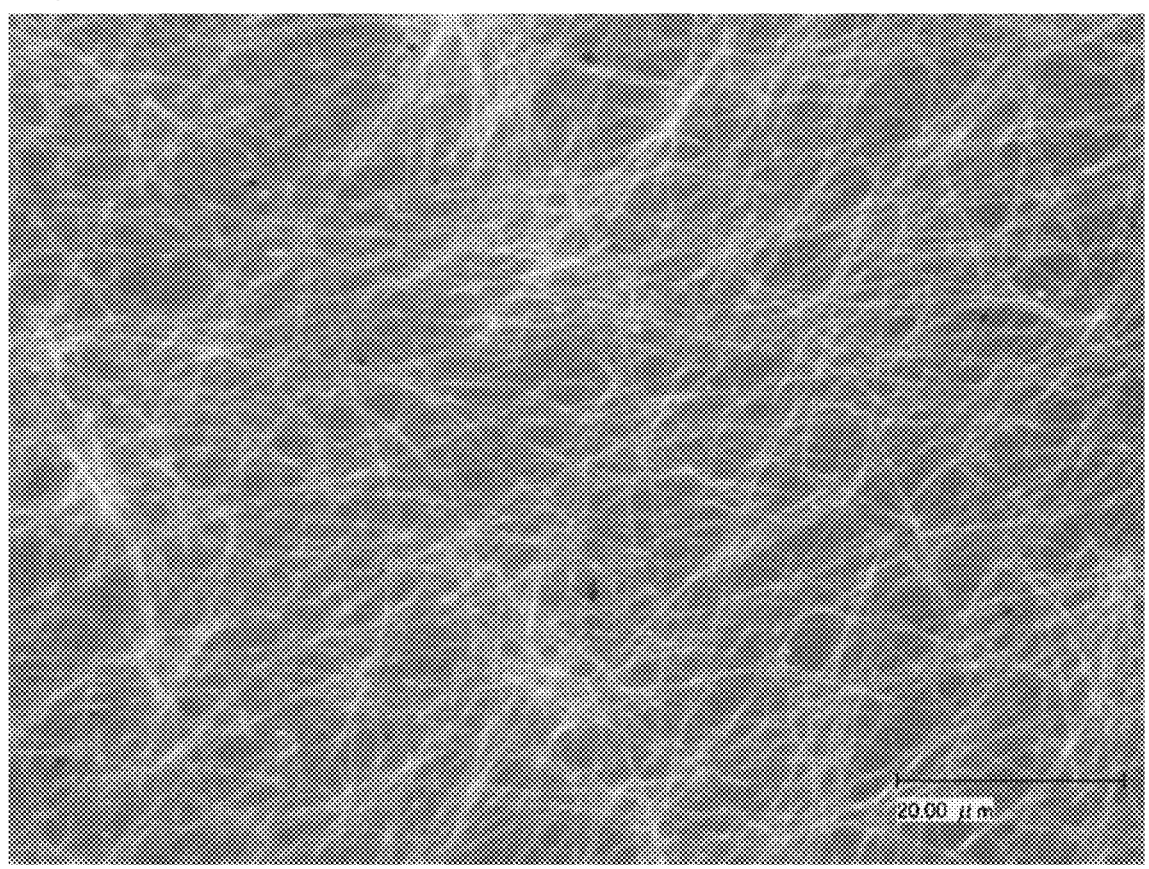
FIG. 7 shows an optical microscope image of silver nanowires obtained by Example 3.
Figure 8:
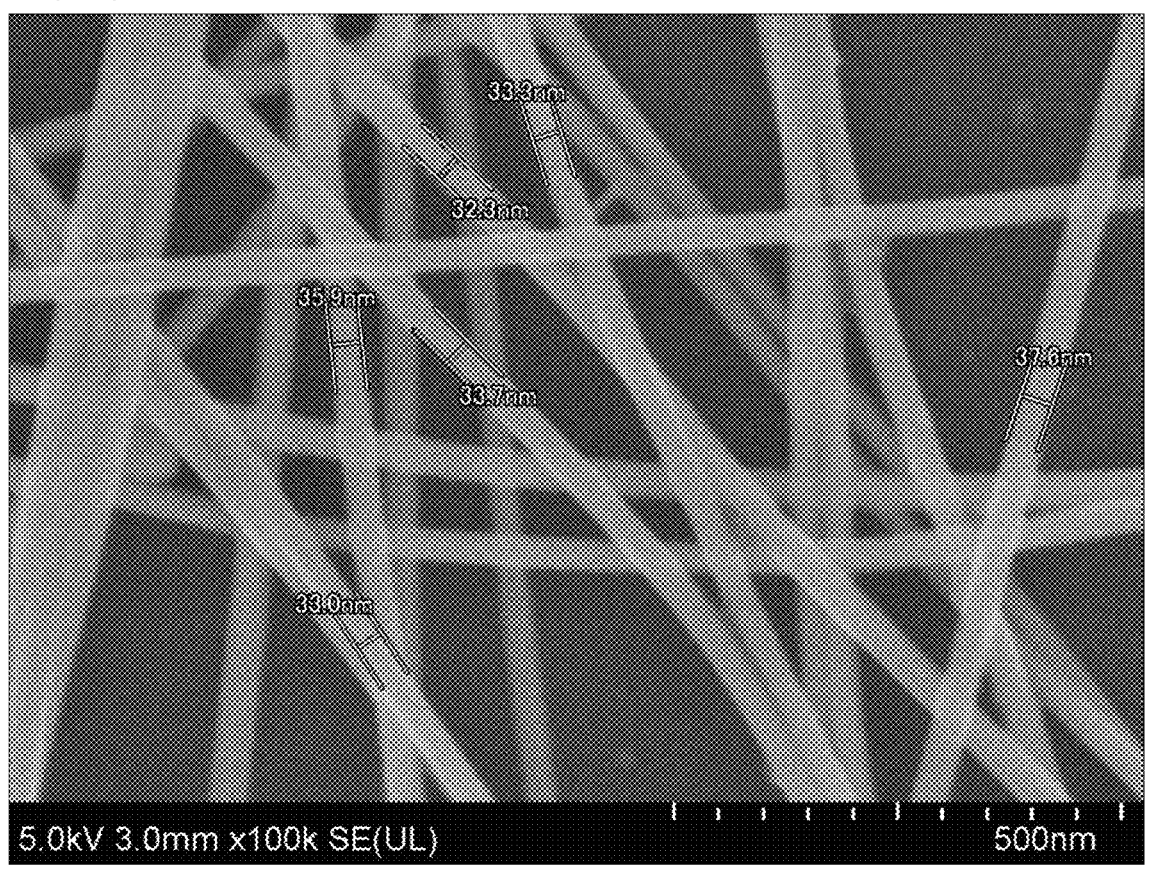
FIG. 8 shows a Field-Emission Scanning Electron Microscope (FE-SEM) image of silver nanowires obtained by Example 3.

Silver nanowires were synthesized and washed by the same operation as Example 1, except that 0.017 g (0.11 mmol) of ferric chloride (manufactured by Wako Pure Chemical Industries, Ltd.) was used instead of tetraethylammonium chloride used in Example 1. In this case, the molar ratio (metal salt/ionic derivative) calculated from the total number of moles of the halogen atoms of the ionic derivative (0.41 mmol) and the number of moles of the silver atoms of the silver nitrate supplied per minute (0.087 mmol), was 0.21. Further, when the silver ion concentration in the first solution was measured during the reaction, the molar ratio between the halogen atoms of the ionic derivative and the metal atoms of the metal salt (the number of moles of the metal atoms of the metal salt/the total number of moles of the halogen atoms of the ionic derivative) was in the range from 0.2 to 8.1. The obtained silver nanowires had an average diameter of 34.6 nm and an average length of 19.6 µm (refer to FIG. 7 and FIG. 8).

Figure 9:
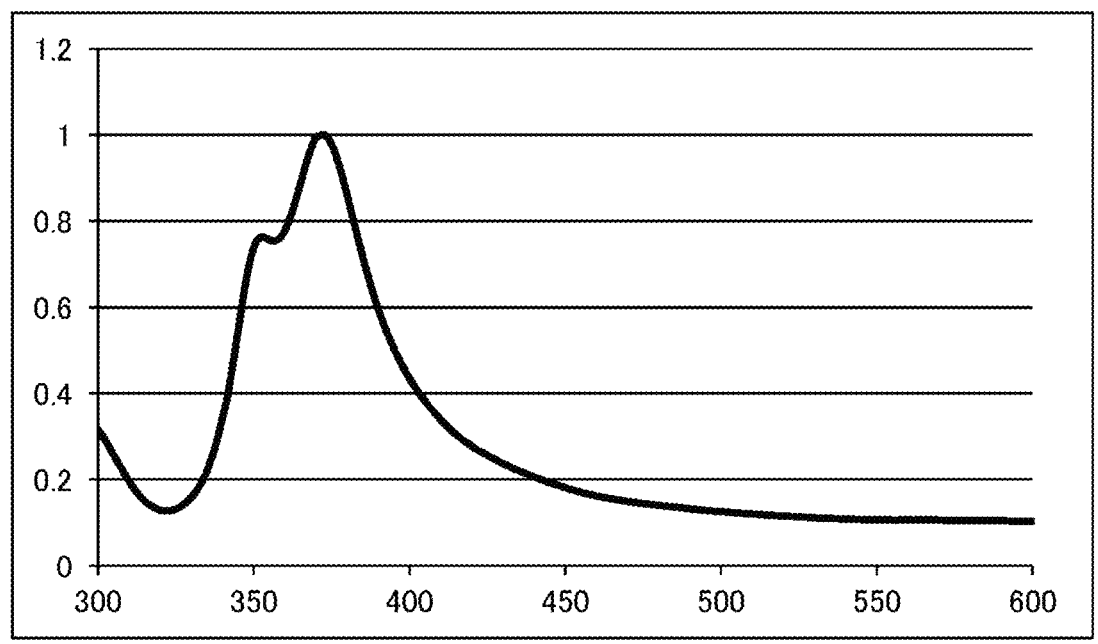
FIG. 9 shows an ultraviolet and visible absorption spectrum of silver nanowires obtained by Example 3.

FIG. 9 shows ultraviolet and visible absorption spectrum of the obtained silver nanowires. The Abs(λ450)/Abs(λmax) obtained from the spectrum of FIG. 9 was 0.18.

Example 4

Figure 10:
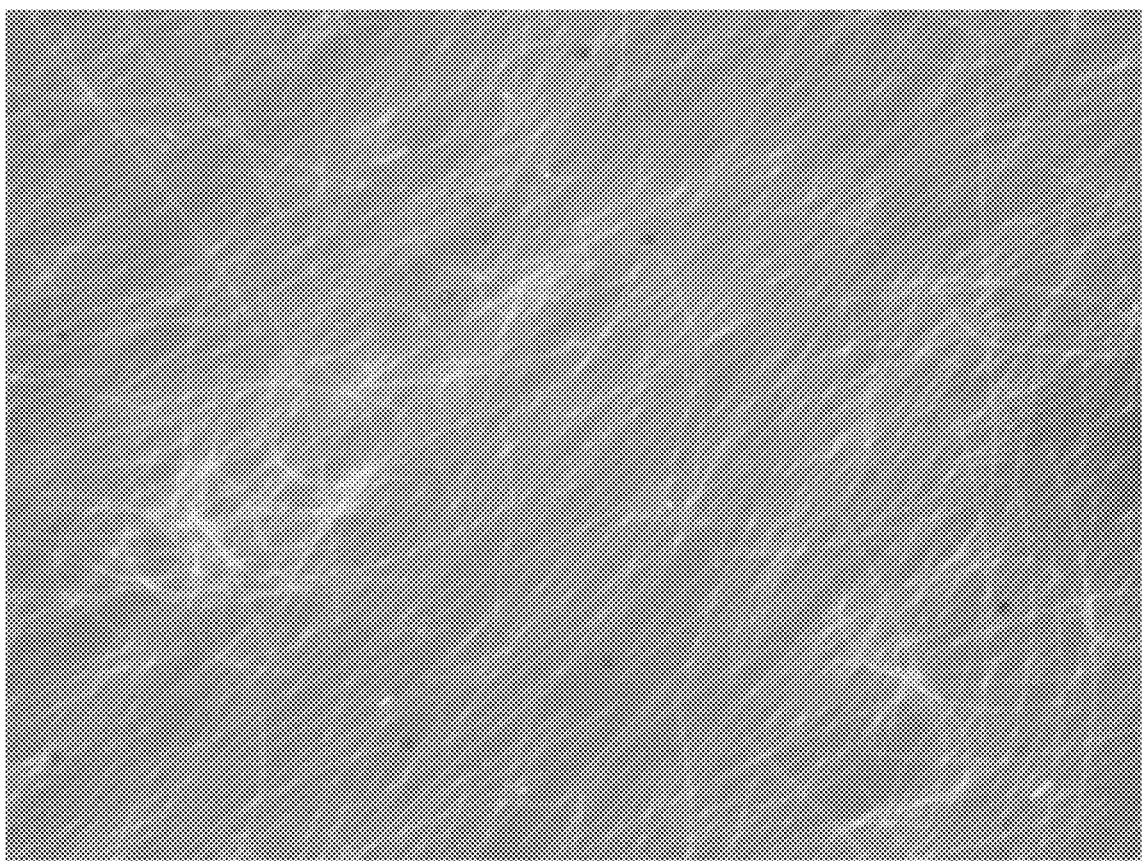
FIG. 10 shows an optical microscope image of silver nanowires obtained by Example 4.
Figure 11:
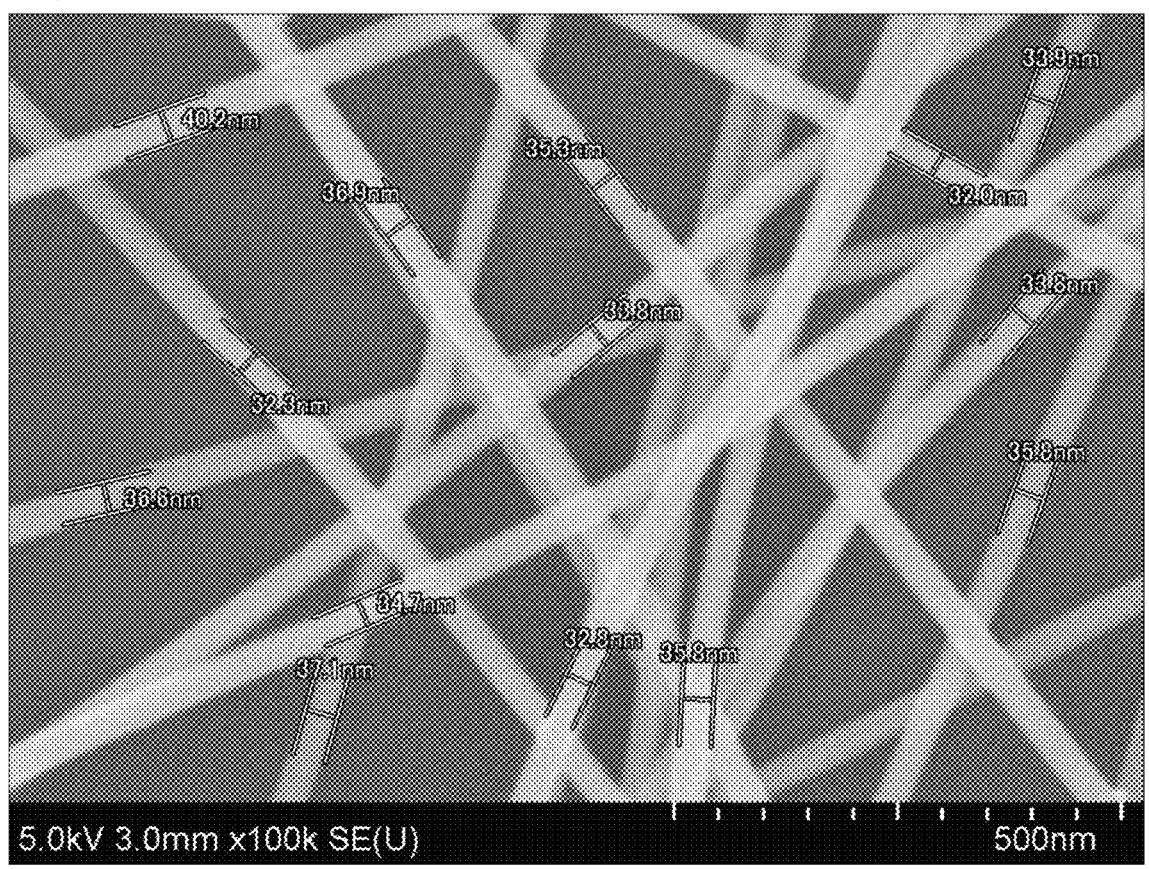
FIG. 11 shows a Field-Emission Scanning Electron Microscope (FE-SEM) image of silver nanowires obtained by Example 4.

Silver nanowires were synthesized and washed by the same operation as Example 1, except that 0.034 g (0.32 mmol) of tetramethylammonium chloride (manufactured by Nihon Tokushu Kagaku Kogyo KK) was used instead of tetraethylammonium chloride in Example 1. In this case, the molar ratio (metal salt/ionic derivative) calculated from the total number of moles of the halogen atoms of the ionic derivative (0.40 mmol) and the number of moles of the silver atoms of the silver nitrate supplied per minute (0.087 mmol), was 0.22. Further, when the silver ion concentration in the first solution was measured during the reaction, the molar ratio between the halogen atoms of the ionic derivative and the metal atoms of the metal salt (the number of moles of the metal atoms of the metal salt/the total number of moles of the halogen atoms of the ionic derivative) was in the range from 0.2 to 6.0. The obtained silver nanowires had an average diameter of 34.4 nm and an average length of 20.8 µm (refer to FIG. 10 and FIG. 11).

Figure 12:
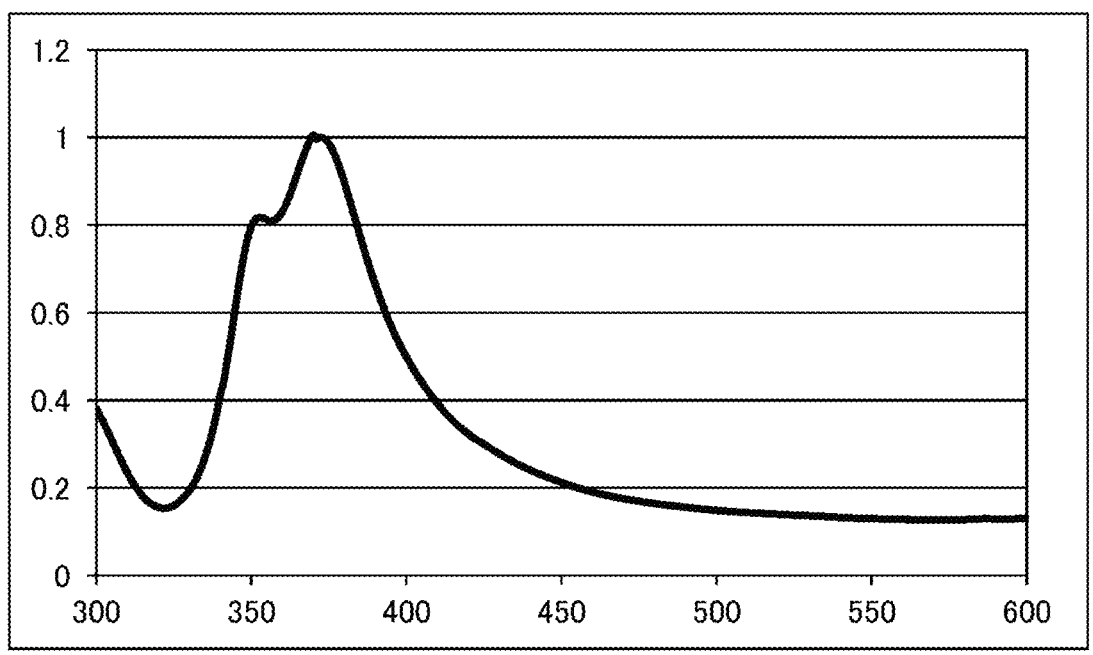
FIG. 12 shows an ultraviolet and visible absorption spectrum of silver nanowires obtained by Example 4.

FIG. 12 shows ultraviolet and visible absorption spectrum of the obtained silver nanowires. The Abs(λ450)/Abs(λmax) obtained from the spectrum of FIG. 12 was 0.21.

Example 5

Figure 13:
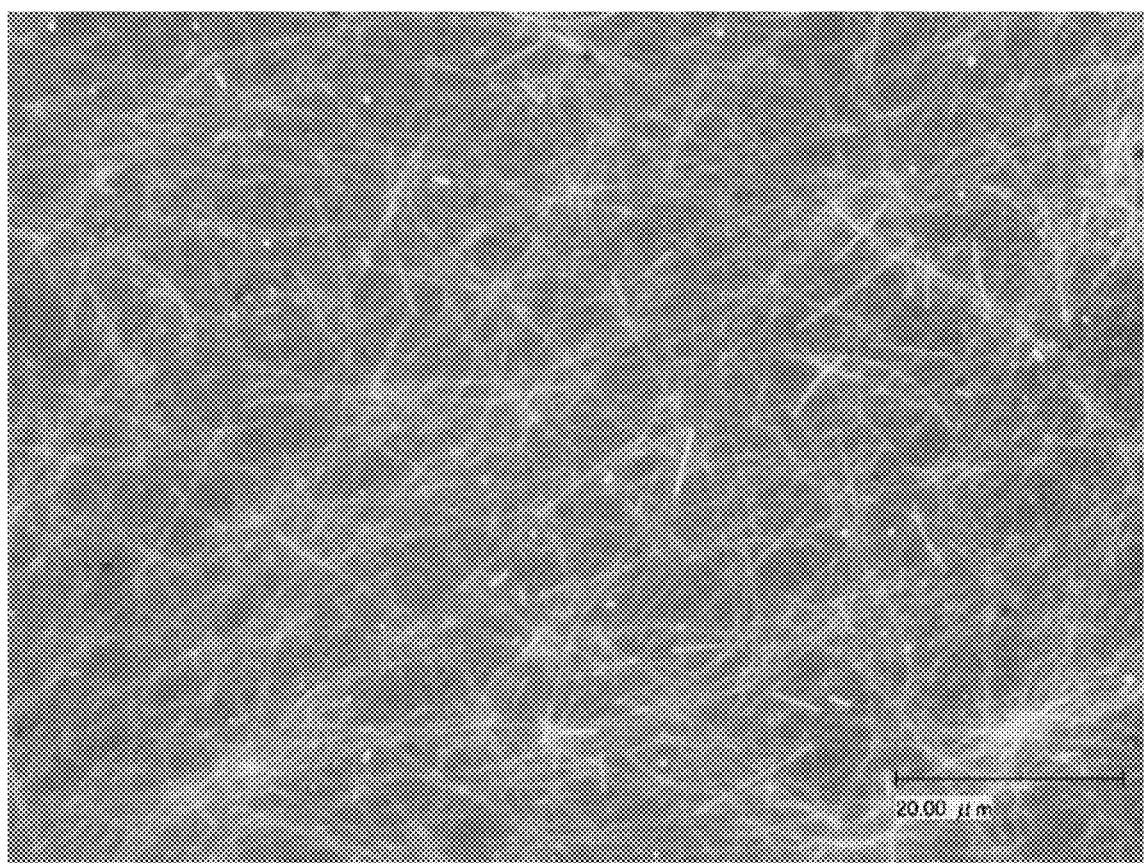
FIG. 13 shows an optical microscope image of silver nanowires obtained by Example 5.
Figure 14:
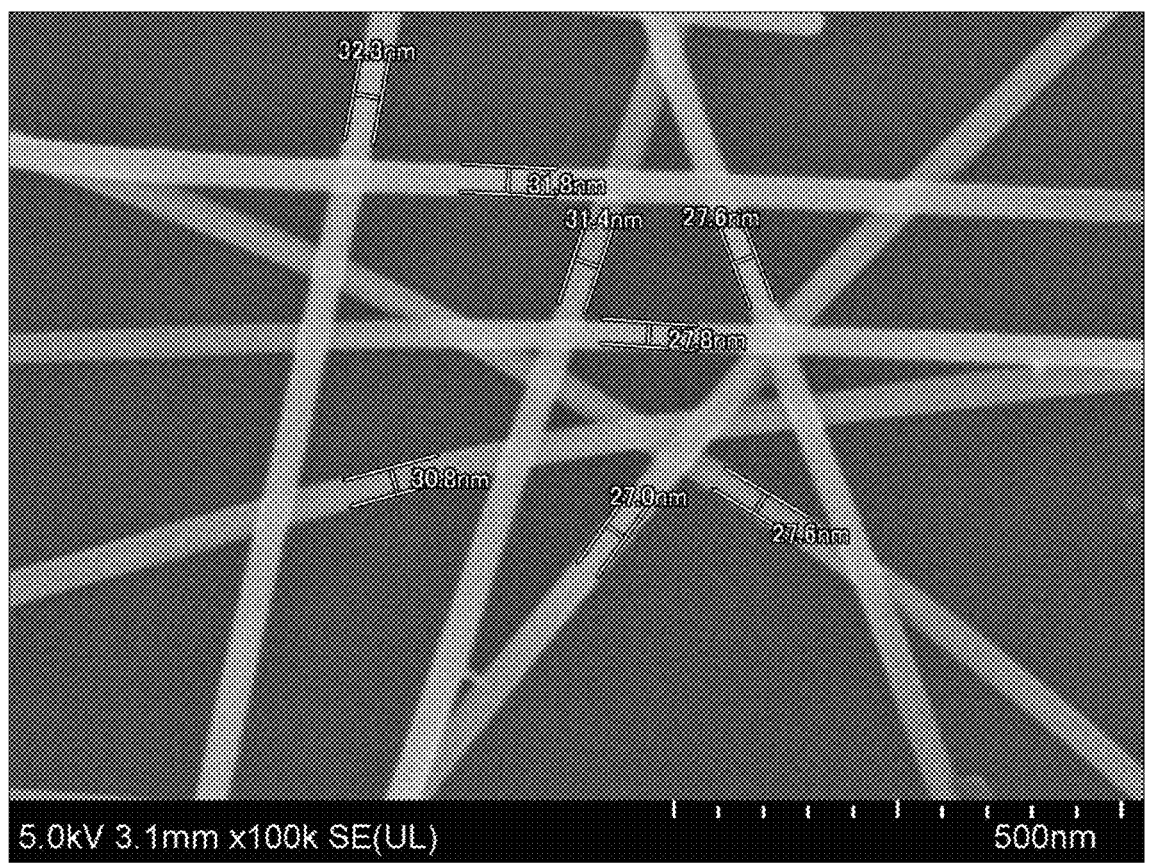
FIG. 14 shows a Field-Emission Scanning Electron Microscope (FE-SEM) image of silver nanowires obtained by Example 5.

Silver nanowires were synthesized and washed by the same operation as Example 1, except that 0.015 g (0.08 mmol) of tetraethylammonium bromide (manufactured by Lion Specialty Chemicals Co., Ltd) was used instead of sodium bromide in Example 1. In this case, the molar ratio (metal salt/ionic derivative) calculated from the total number of moles of the halogen atoms of the ionic derivative (0.40 mmol) and the number of moles of the silver atoms of the silver nitrate supplied per minute (0.087 mmol), was 0.22. Further, when the silver ion concentration in the first solution was measured during the reaction, the molar ratio between the halogen atoms of the ionic derivative and the metal atoms of the metal salt (the number of moles of the metal atoms of the metal salt/the total number of moles of the halogen atoms of the ionic derivative) was in the range from 0.2 to 7.0. The obtained silver nanowires had an average diameter of 33.2 nm and an average length of 27.7 µm (refer to FIG. 13 and FIG. 14).

Figure 15:
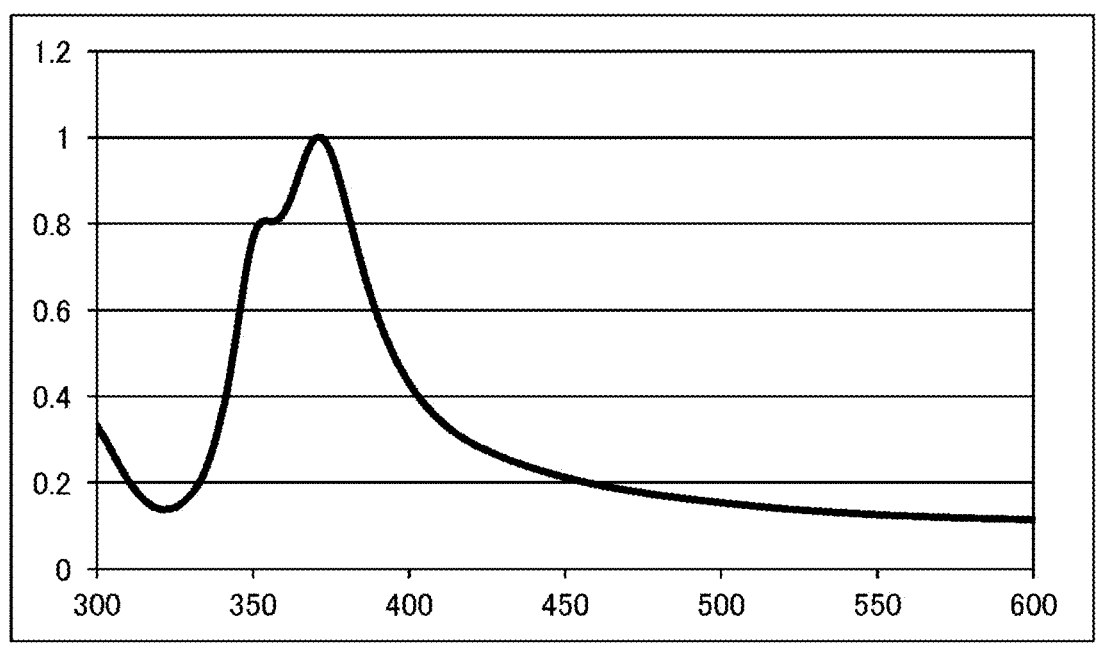
FIG. 15 shows an ultraviolet and visible absorption spectrum of silver nanowires obtained by Example 5.

FIG. 15 shows ultraviolet and visible absorption spectrum of the obtained silver nanowires. The Abs(λ450)/Abs(λmax) obtained from the spectrum of FIG. 15 was 0.21.

Example 6

Figure 16:
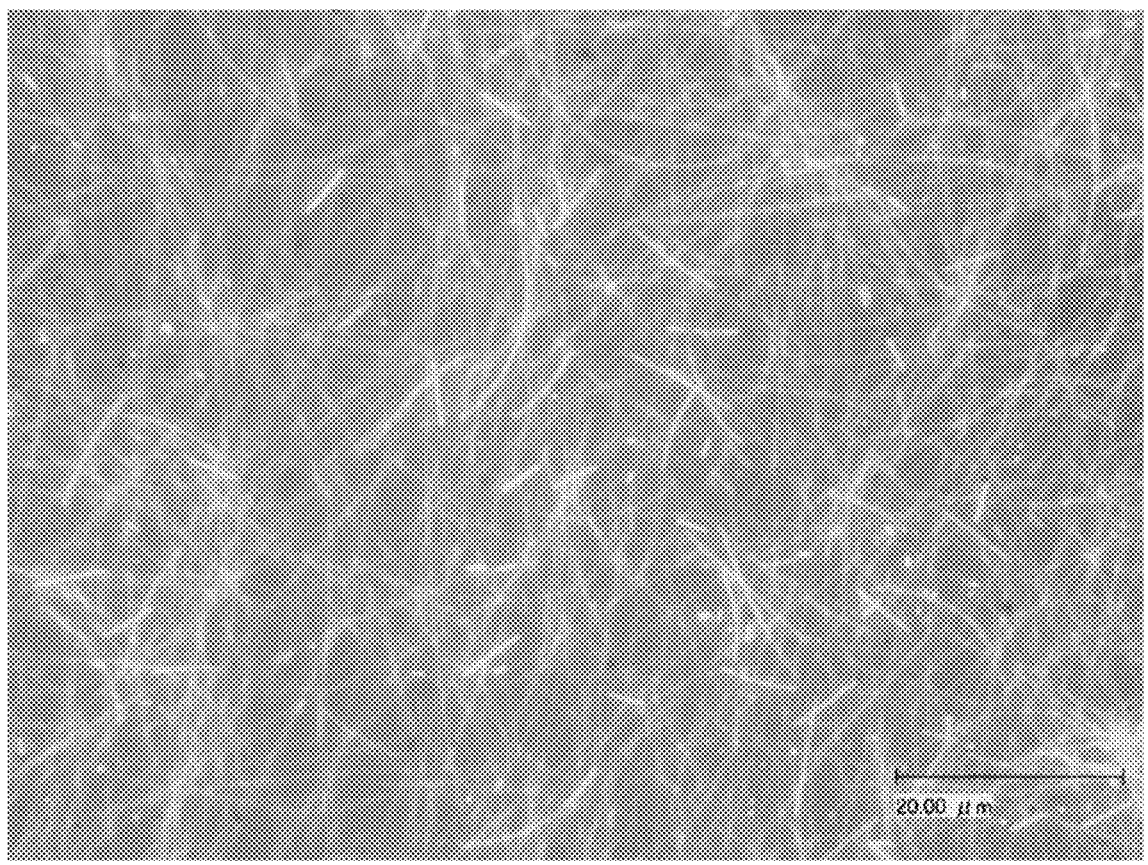
FIG. 16 shows an optical microscope image of silver nanowires obtained by Example 6.
Figure 17:
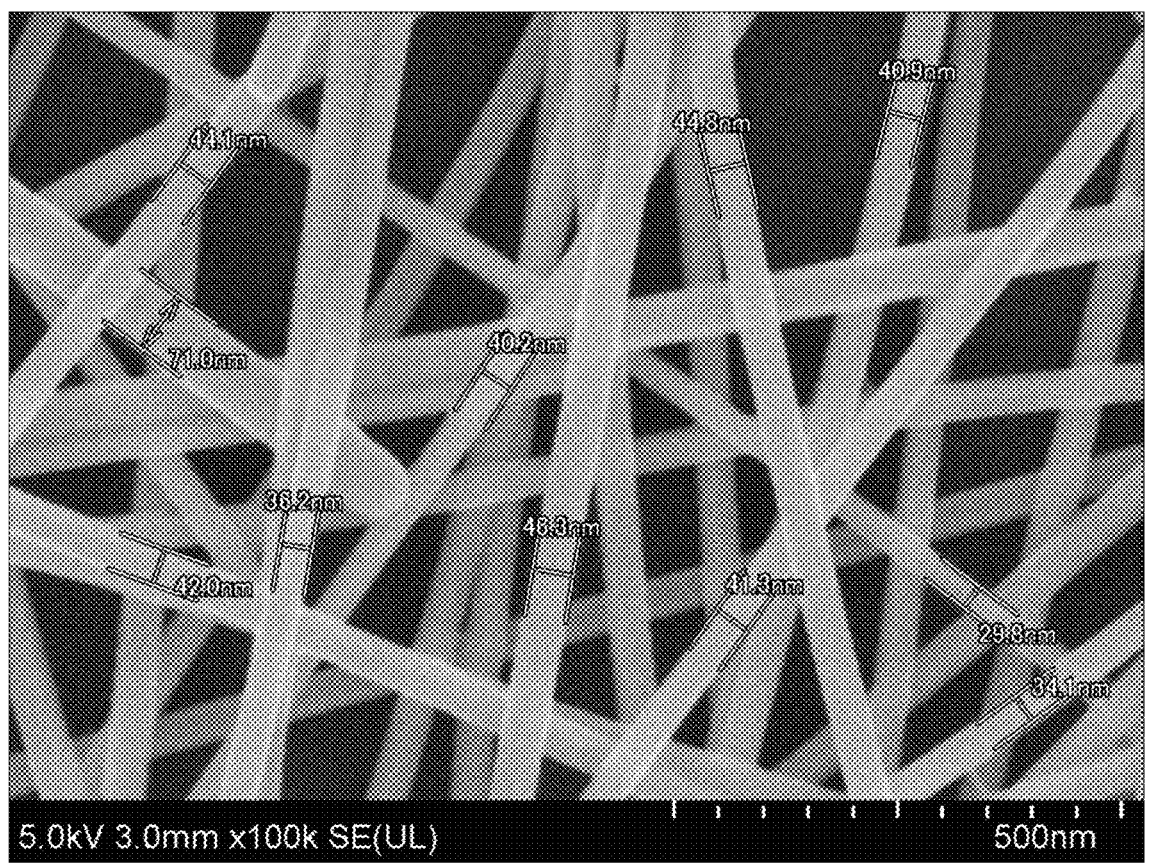
FIG. 17 shows a Field-Emission Scanning Electron Microscope (FE-SEM) image of silver nanowires obtained by Example 6.

Silver nanowires were synthesized and washed by the same operation as Example 1, except that 0.075 g (0.40 mmol) of tetraethylammonium chloride was used instead of tetraethylammonium chloride and sodium bromide, i.e., ionic derivatives in Example 1. In this case, the molar ratio (metal salt/ionic derivative) calculated from the total number of moles of the halogen atoms of the ionic derivative (0.40 mmol) and the number of moles of the silver atoms of the silver nitrate supplied per minute (0.087 mmol), was 0.22. Further, when the silver ion concentration in the first solution was measured during the reaction, the molar ratio between the halogen atoms of the ionic derivative and the metal atoms of the metal salt (the number of moles of the metal atoms of the metal salt/the total number of moles of the halogen atoms of the ionic derivative) was in the range from 0.2 to 5.8. The obtained silver nanowires had an average diameter of 42.4 nm and an average length of 18.9 µm (refer to FIG. 16 and FIG. 17).

Figure 18:
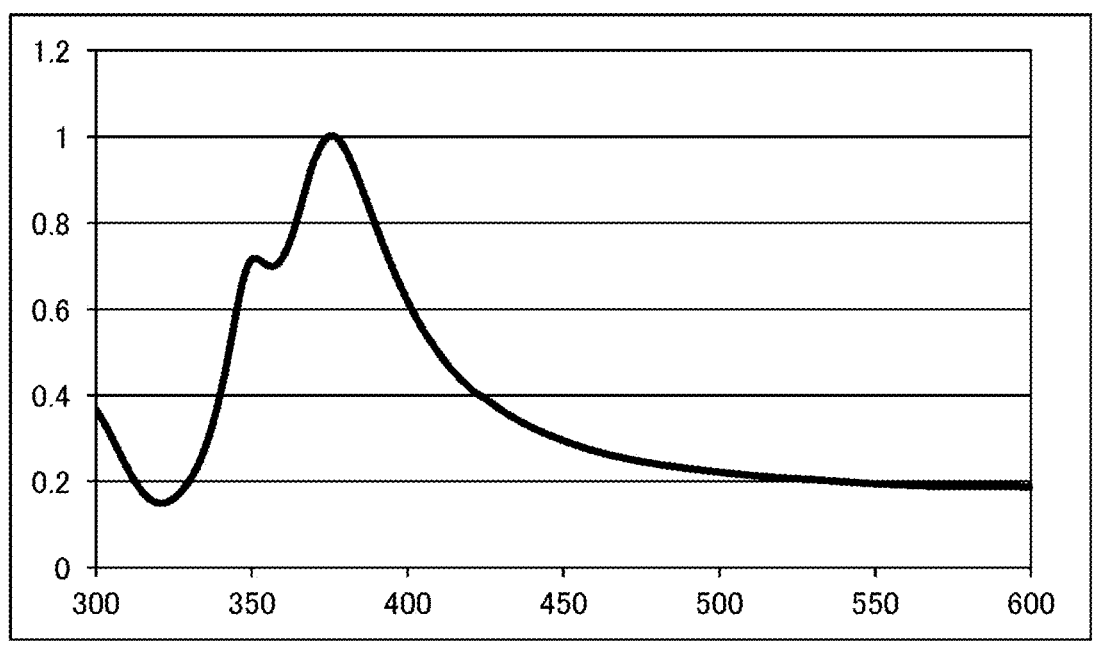
FIG. 18 shows an ultraviolet and visible absorption spectrum of silver nanowires obtained by Example 6.

FIG. 18 shows ultraviolet and visible absorption spectrum of the obtained silver nanowires. The Abs(λ450)/Abs(λmax) obtained from the spectrum of FIG. 18 was 0.29.

Example 7

Silver nanowires were synthesized and washed by the same operation as Example 1, except that 7.2 g of polyvinylpyrrolidone K-90 (PVP) (manufactured by Wako Pure Chemical Industries, Ltd., weight average molecular weight: 350,000) as a structure-directing agent was mixed to the second solution instead of the first solution. The silver nitrate solution (second solution) was prepared in the way that 100 g of propylene glycol (manufactured by Wako Pure Chemical Industries, Ltd.) was weighed and charged in a 200 mL glass container and stirred with a stirrer, and therewhile, 7.2 g of polyvinylpyrrolidone K-90 (PVP) (manufactured by Wako Pure Chemical Industries, Ltd., weight average molecular weight: 350,000), i.e., a structure-directing agent, was added thereto little by little, which were stirred for 2 hours at a room temperature to dissolve the same completely, and thereafter, 2.3 g (13 mmol) of silver nitrate (manufactured by Toyo Chemical Industrial Co., Ltd.), i.e., metal salt, was added to the glass container, and the resultant was stirred for 12 hours at a room temperature.

The first solution was prepared in the way that 600 g of propylene glycol, 0.052 g (0.32 mmol) of tetraethylammonium chloride (manufactured Lion Specialty Chemicals Co., Ltd) and 0.008 g (0.08 mmol) of sodium bromide (manufactured by Manac Incorporated) as ionic derivatives, were prepared in a 1 L four-neck flask (equipped with mechanical stirrer, dropping funnel, reflux condenser, thermometer, nitrogen-gas inlet tube), under a nitrogen atmosphere, which was stirred at the rotational speed of 200 rpm for one hour at the temperature of 150° C. so that the contents were completely dissolved. In this case, the molar ratio (metal salt/ionic derivative) calculated between the total number of moles of the halogen atoms of the ionic derivative (0.40 mmol) and the number of moles of the silver atom of the silver nitrate supplied per minute (0.087 mmol), was 0.22. Further, with respect to the silver ion concentration in the first solution during the reaction, the molar ratio between the halogen atoms of the ionic derivative and the metal atoms of the metal salt (the number of moles of the metal atoms of the metal salt/the total number of moles of the halogen atoms of the ionic derivative) was in the range from 0.2 to 7.1.

Figure 19:
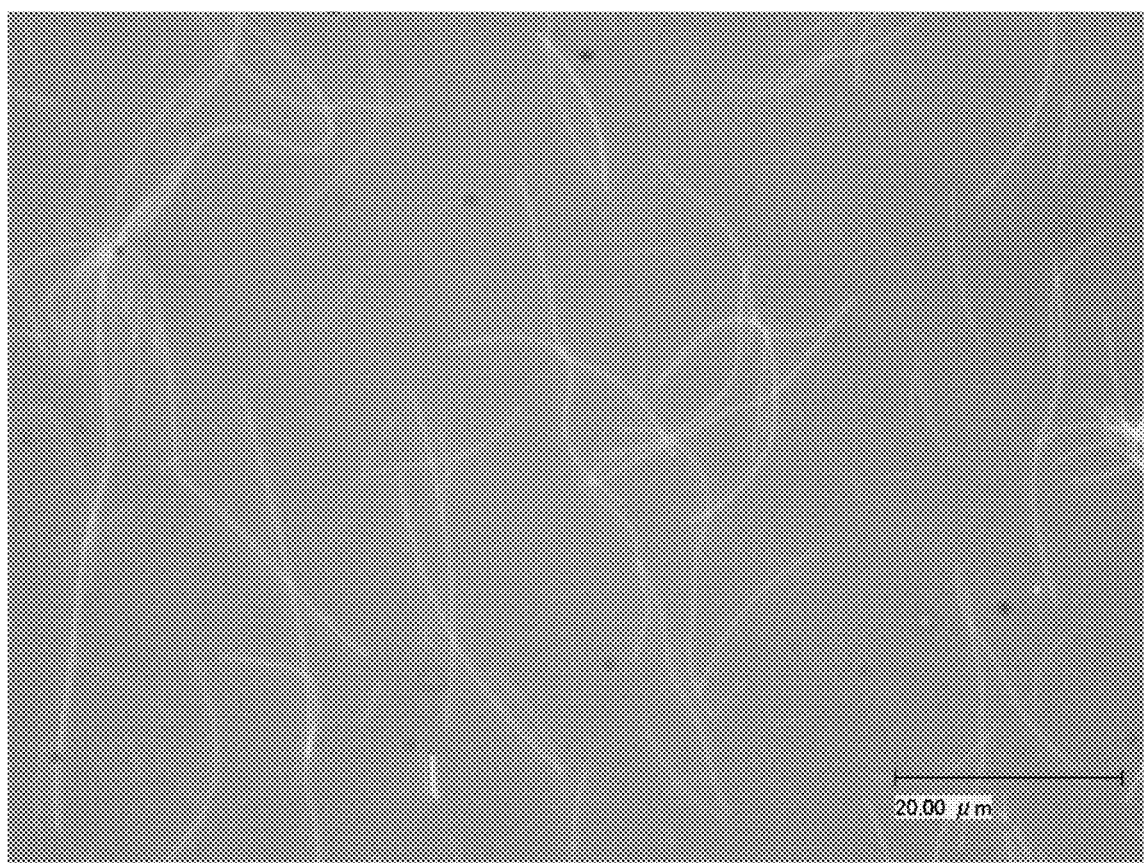
FIG. 19 shows an optical microscope image of silver nanowires obtained by Example 7.
Figure 20:
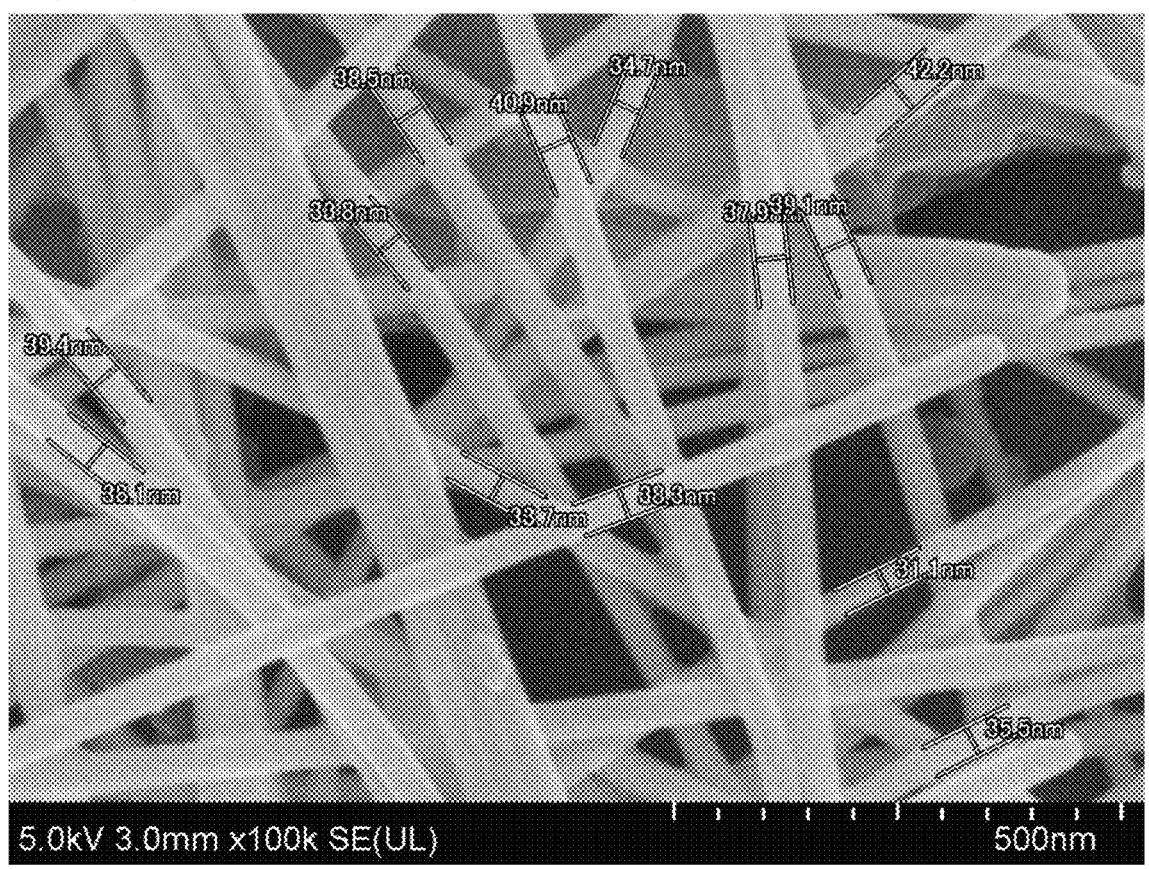
FIG. 20 shows a Field-Emission Scanning Electron Microscope (FE-SEM) image of silver nanowires obtained by Example 7.

FIG. 19 shows an optical microscope image of the obtained silver nanowires. The diameters and the lengths of the obtained silver nanowires were obtained by the above-mentioned method using the Field-Emission Scanning Electron Microscope (FE-SEM) image (FIG. 20), and the average diameter was 37.3 nm and the average length was 22.7 µm.

Figure 21:
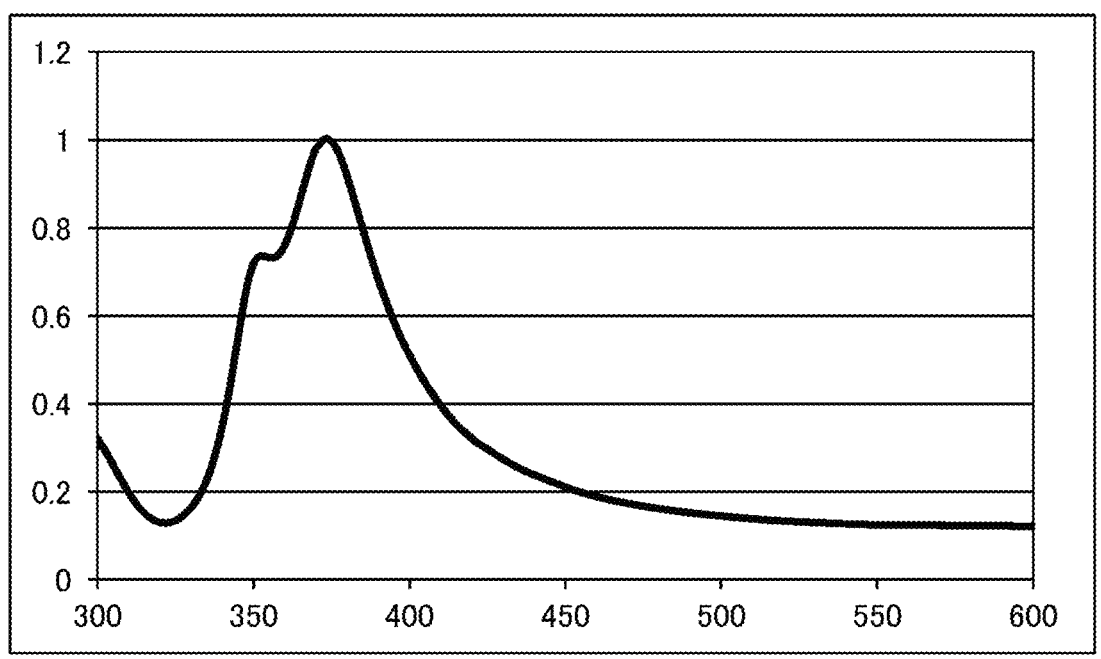
FIG. 21 shows an ultraviolet and visible absorption spectrum of silver nanowires obtained by Example 7.

FIG. 21 shows ultraviolet and visible absorption spectrum of the obtained silver nanowires. The Abs(λ450)/Abs(λmax) obtained from the spectrum of FIG. 21 was 0.21.

Example 8

Silver nanowires were synthesized and washed by the same operation as Example 7, except that the second solution was prepared by using, as the structure-directing agent, 3.6 g of polyvinylpyrrolidone K-90 (PVP) (manufactured by Wako Pure Chemical Industries, Ltd., weight average molecular weight: 350,000) and 3.6 g of copolymer consisting of vinylpyrrolidone and vinyl acetate in the ratio of 1:1 (PVA-6450, manufactured by Osaka Organic Chemical Industry Ltd., weight average molecular weight: 50,000), instead of 7.2 g of polyvinylpyrrolidone K-90 (PVP) (manufactured by Wako Pure Chemical Industries, Ltd., weight average molecular weight: 350,000).

In this case, the molar ratio (metal salt/ionic derivative) calculated from the total number of moles of the halogen atoms of the ionic derivative (0.40 mmol) and the number of moles of the silver atoms of the silver nitrate supplied per minute (0.087 mmol), was 0.22. Further, when the silver ion concentration in the first solution was measured during the reaction, the molar ratio between the halogen atoms of the ionic derivative and the metal atoms of the metal salt (the number of moles of the metal atoms of the metal salt/total number of moles of the halogen atoms of the ionic derivative) was in the range from 0.14 to 6.7.

Figure 22:
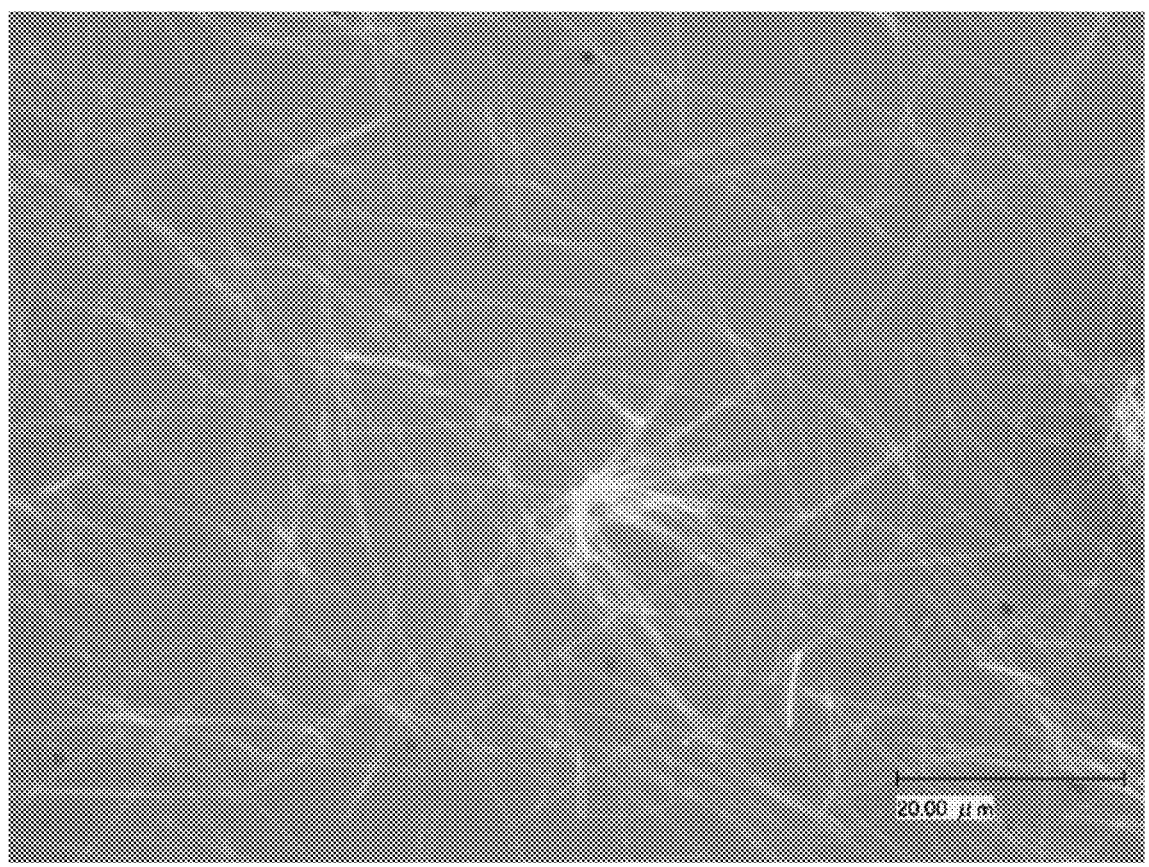
FIG. 22 shows an optical microscope image of silver nanowires obtained by Example 8.
Figure 23:
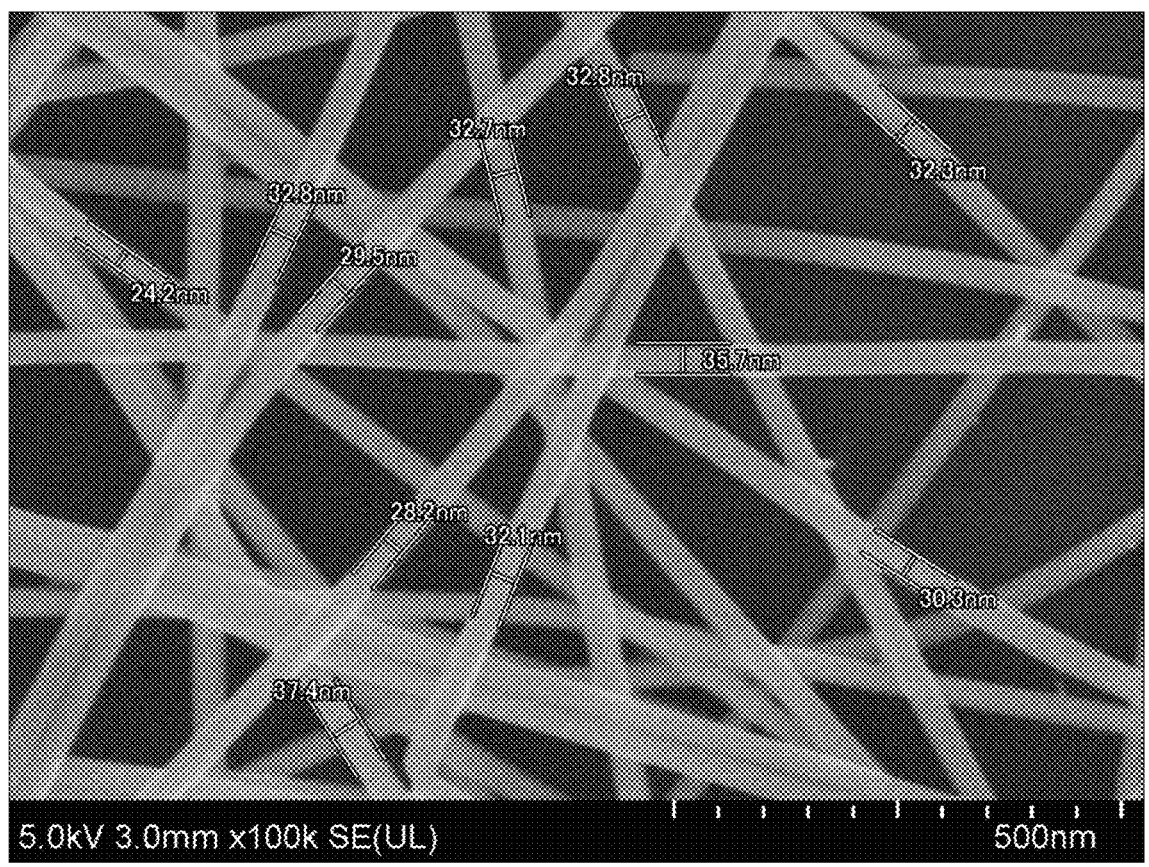
FIG. 23 shows a Field-Emission Scanning Electron Microscope (FE-SEM) image of silver nanowires obtained by Example 8.

FIG. 22 shows an optical microscope image of the obtained silver nanowires. The diameters and the lengths of the obtained silver nanowires were obtained by the above-mentioned method using the Field-Emission Scanning Electron Microscope (FE-SEM) image (FIG. 23), and the average diameter was 32.0 nm and the average length was 18.3 µm.

Figure 24:
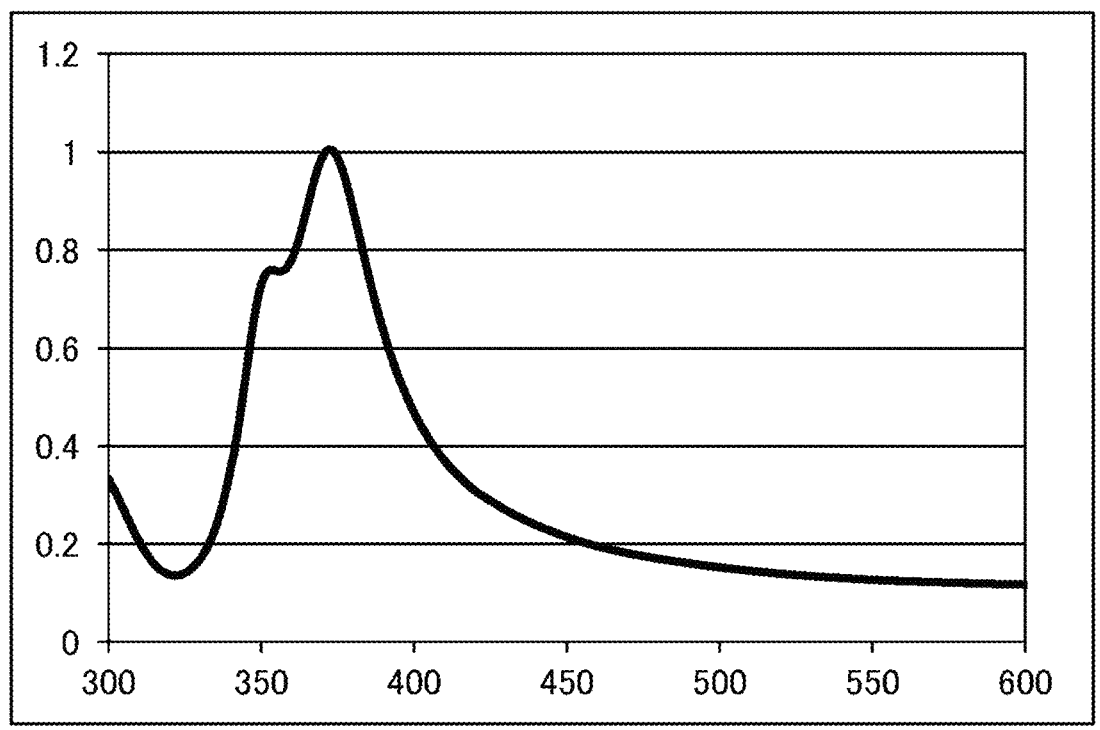
FIG. 24 shows an ultraviolet and visible absorption spectrum of silver nanowires obtained by Example 8.

FIG. 24 shows ultraviolet and visible absorption spectrum of the obtained silver nanowires. The Abs(λ450)/Abs(λmax) obtained from the spectrum of FIG. 24 was 0.21.

Example 9

Silver nanowires were synthesized and washed by substantially the same operation as Example 7, except that, as the structure-directing agent, half (3.6 g) of 7.2 g polyvinylpyrrolidone K-90 (PVP) (manufactured by Wako Pure Chemical Industries, Ltd., weight average molecular weight: 350,000) was mixed to each of the first solution and the second solution, and that the dropping speed of the second solution was changed.

The silver nitrate solution (second solution) was prepared in the way that 100 g of propylene glycol (manufactured by Wako Pure Chemical Industries, Ltd.) was weighed and charged in a 200 mL glass container and stirred with a stirrer, and therewhile, 3.6 g of polyvinylpyrrolidone K-90 (PVP) (manufactured by Wako Pure Chemical Industries, Ltd.), i.e., a structure-directing agent, was added thereto little by little, which were stirred for 2 hours at a room temperature to dissolve the same, and thereafter, 2.3 g (13 mmol) of silver nitrate (manufactured by Toyo Chemical Industrial Co., Ltd.), i.e., a metal salt, was added to the glass container, and the resultant was stirred for 12 hours at a room temperature.

The first solution was prepared in the way that 600 g of propylene glycol, 0.052 g (0.32 mmol) of tetraethylammonium chloride (manufactured Lion Specialty Chemicals Co., Ltd) and 0.008 g (0.08 mmol) of sodium bromide (manufactured by Manac Incorporated) as ionic derivatives, and 3.6 g of polyvinylpyrrolidone K-90 (PVP) (manufactured by Wako Pure Chemical Industries, Ltd., weight average molecular weight: 350,000) as a structure-directing agent, were prepared in a 1 L four-neck flask (equipped with mechanical stirrer, dropping funnel, reflux condenser, thermometer, nitrogen-gas inlet tube), under a nitrogen atmosphere, which was stirred at the rotational speed of 200 rpm for one hour at the temperature of 150° C. so that the contents were completely dissolved. The previously prepared silver nitrate solution (second solution) was set in the dropping funnel, and was dropped into the first solution at the temperature of 150° C., for 4 hours (number of moles of the supplied silver nitrate: 0.054 mmol/min), and thereby, silver nanowires were synthesized. In this case, the molar ratio (metal salt/ionic derivative) calculated between the total number of moles of the halogen atoms of the ionic derivative in the first solution (0.40 mmol) and the number of moles of the silver atoms of the silver nitrate supplied per minute (0.054 mmol), was 0.14. Further, with respect to the silver ion concentration in the first solution during the reaction, the molar ratio between the halogen atoms of the ionic derivative and the metal atoms of the metal salt (the number of moles of the metal atoms of the metal salt/the total number of moles of the halogen atoms of the ionic derivative) was in the range from 0.13 to 7.1. After the dropping was finished, heating and stirring were continued for one hour, and then, the reaction was completed.

Figure 25:
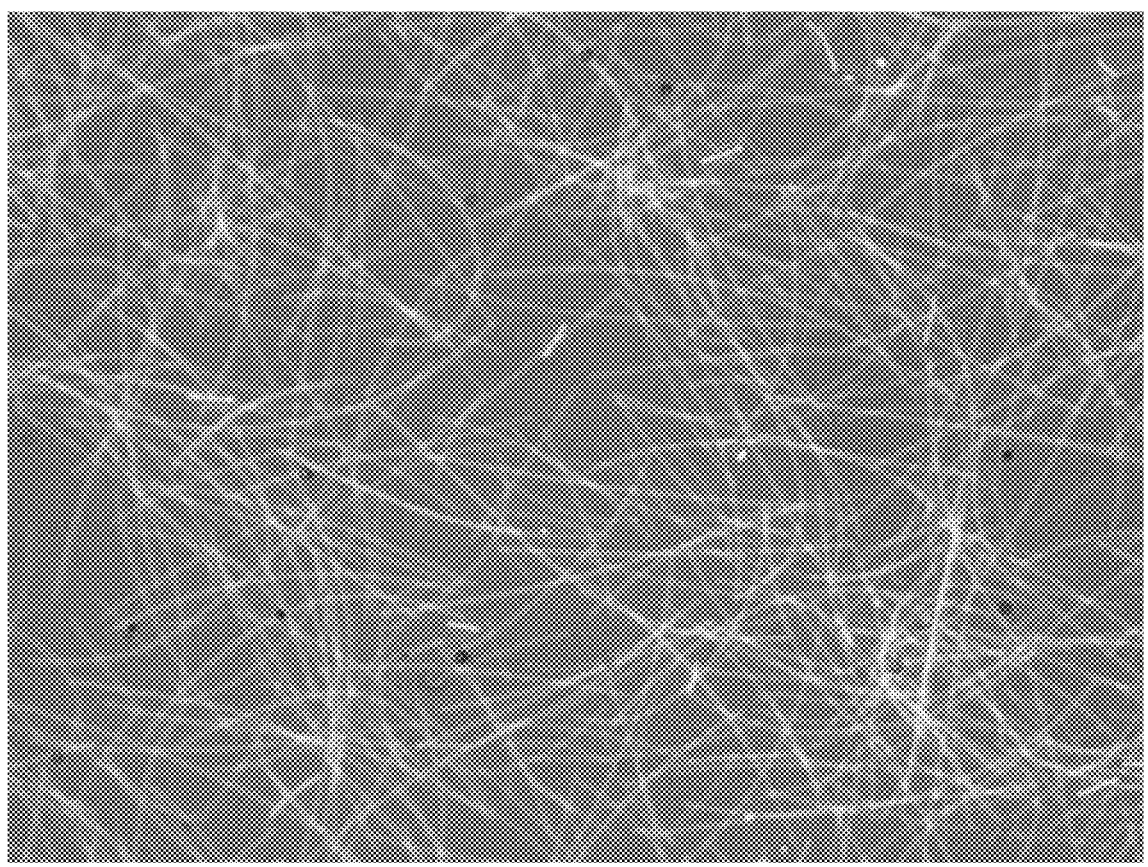
FIG. 25 shows an optical microscope image of silver nanowires obtained by Example 9.
Figure 26:
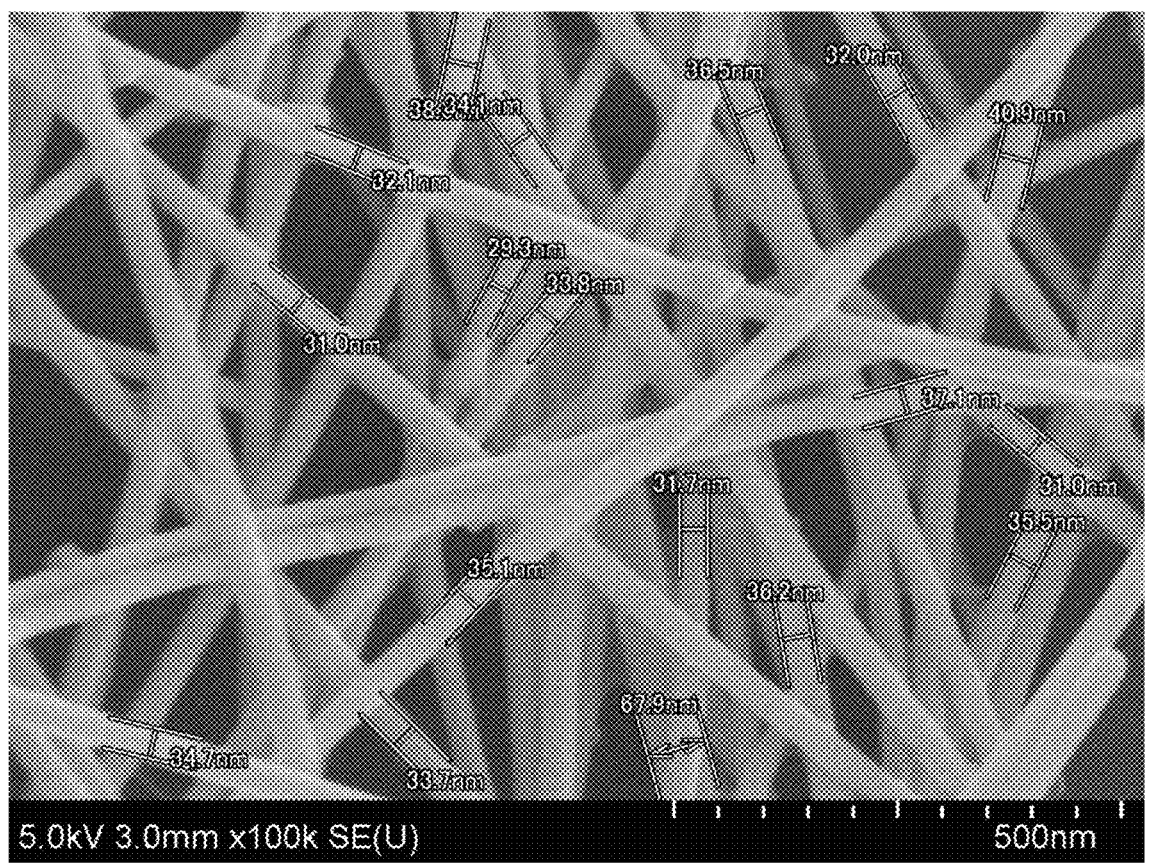
FIG. 26 shows a Field-Emission Scanning Electron Microscope (FE-SEM) image of silver nanowires obtained by Example 9.

FIG. 25 shows an optical microscope image of the obtained silver nanowires. The diameters and the lengths of the obtained silver nanowires were obtained by the above-mentioned method using the Field-Emission Scanning Electron Microscope (FE-SEM) image (FIG. 26), and the average diameter was 38.5 nm and the average length was 19.8 µm.

Figure 27:
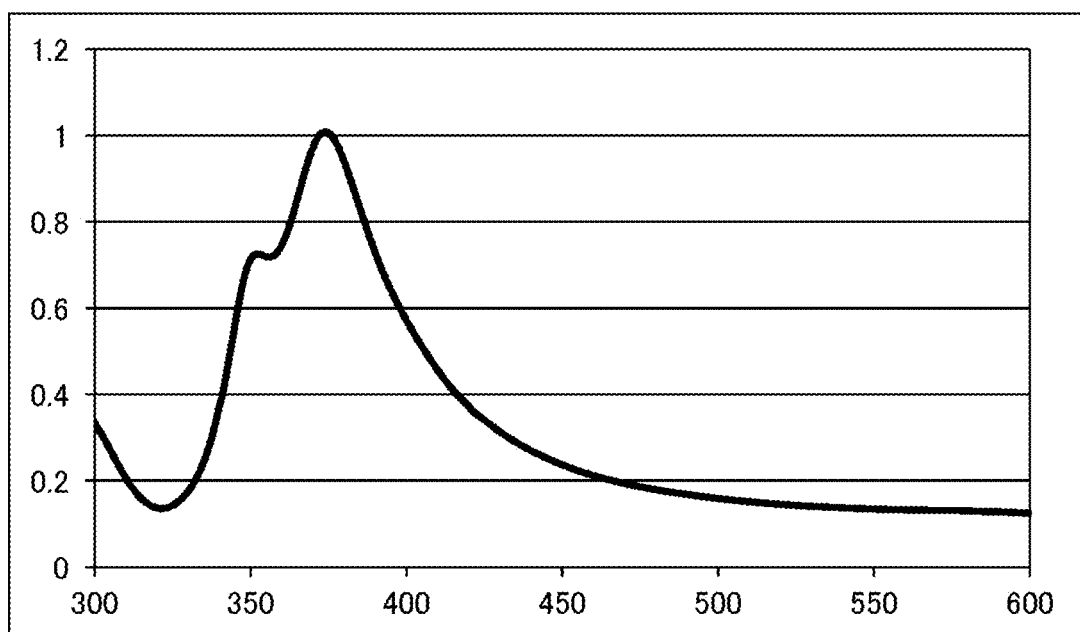
FIG. 27 shows an ultraviolet and visible absorption spectrum of silver nanowires obtained by Example 9.

FIG. 27 shows ultraviolet and visible absorption spectrum of the obtained silver nanowires. The Abs(λ450)/Abs(λmax) obtained from the spectrum of FIG. 27 was 0.24.

Example 10

Silver nanowires were synthesized and washed by the same operation as Example 9, except that, as the structure-directing agents, 3.6 g of polyvinylpyrrolidone K-90 (PVP) (manufactured by Wako Pure Chemical Industries, Ltd., weight average molecular weight: 350,000) and 3.6 g of copolymer consisting of vinylpyrrolidone and vinyl acetate in the ratio of 1:1 (PVA-6450, manufactured by Osaka Organic Chemical Industry Ltd., weight average molecular weight: 50,000) were used in the first solution and the second solution, respectively, instead of 3.6 g each of polyvinylpyrrolidone K-90 (PVP) (manufactured by Wako Pure Chemical Industries, Ltd., weight average molecular weight: 350,000).

In this case, the molar ratio (metal salt/ionic derivative) calculated from the total number of moles of the halogen atoms of the ionic derivative (0.40 mmol) and the number of moles of the silver atoms of the silver nitrate supplied per minute (0.054 mmol), was 0.14. Further, when the silver ion concentration in the first solution was measured during the reaction, the molar ratio between the halogen atoms of the ionic derivative and the metal atoms of the metal salt (the number of moles of the metal atoms of the metal salt/the total number of moles of the halogen atoms of the ionic derivative) was in the range from 0.14 to 8.3.

Figure 28:
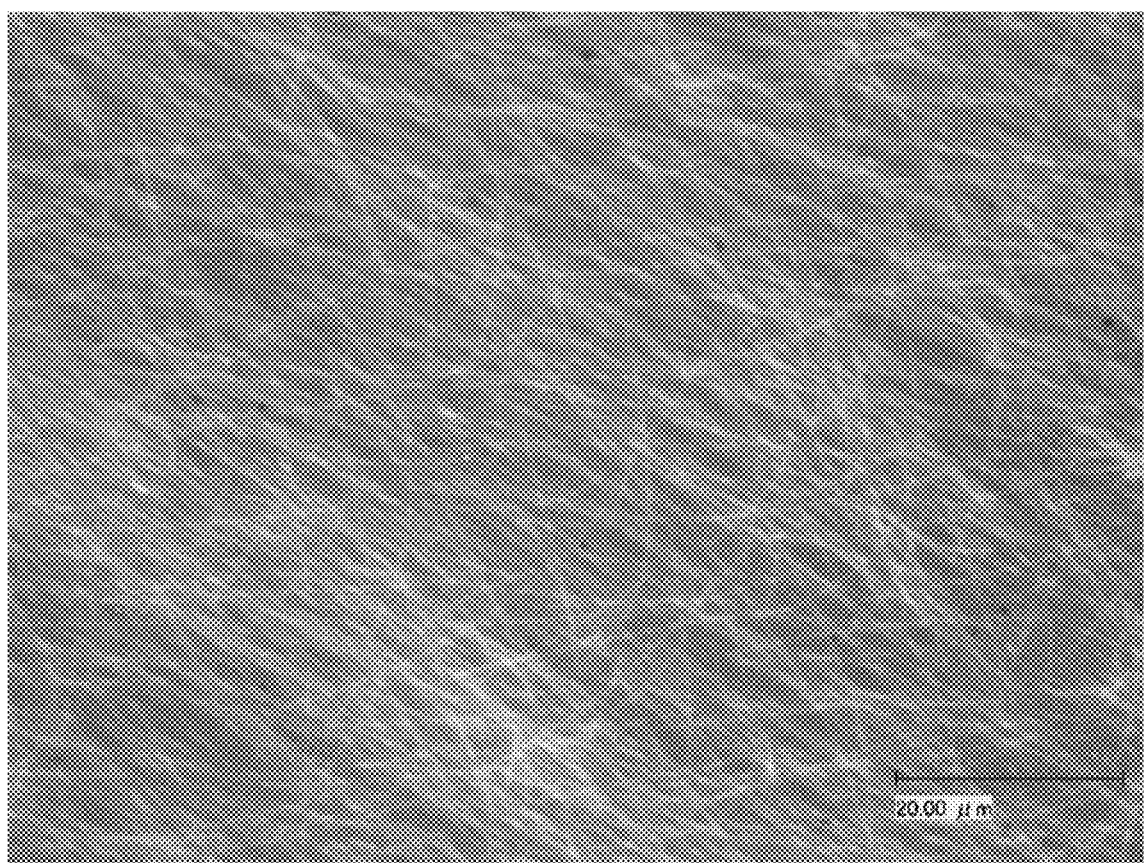
FIG. 28 shows an optical microscope image of silver nanowires obtained by Example 10.
Figure 29:
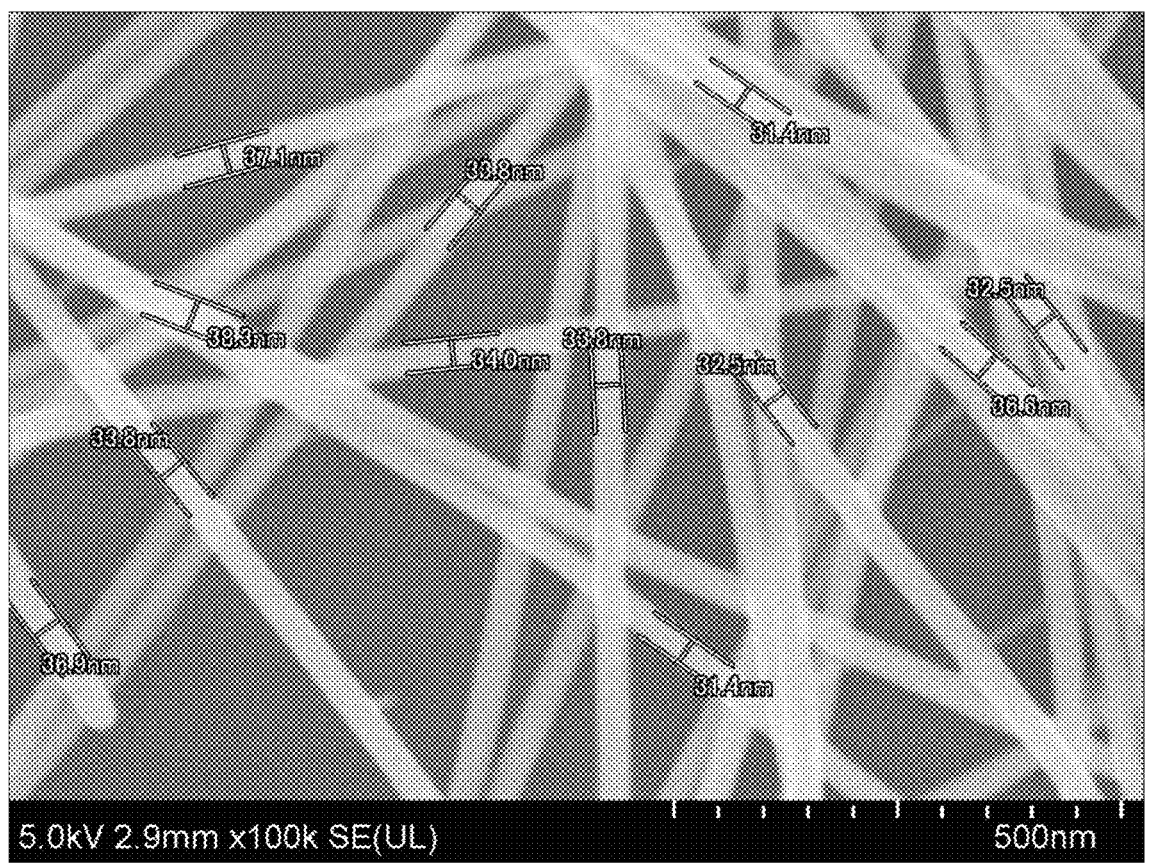
FIG. 29 shows a Field-Emission Scanning Electron Microscope (FE-SEM) image of silver nanowires obtained by Example 10.

FIG. 28 shows an optical microscope image of the obtained silver nanowires. The diameters and the lengths of the obtained silver nanowires were obtained by the above-mentioned method using the Field-Emission Scanning Electron Microscope (FE-SEM) image (FIG. 29), and the average diameter was 33.2 nm and the average length was 16.5 µm.

Figure 30:
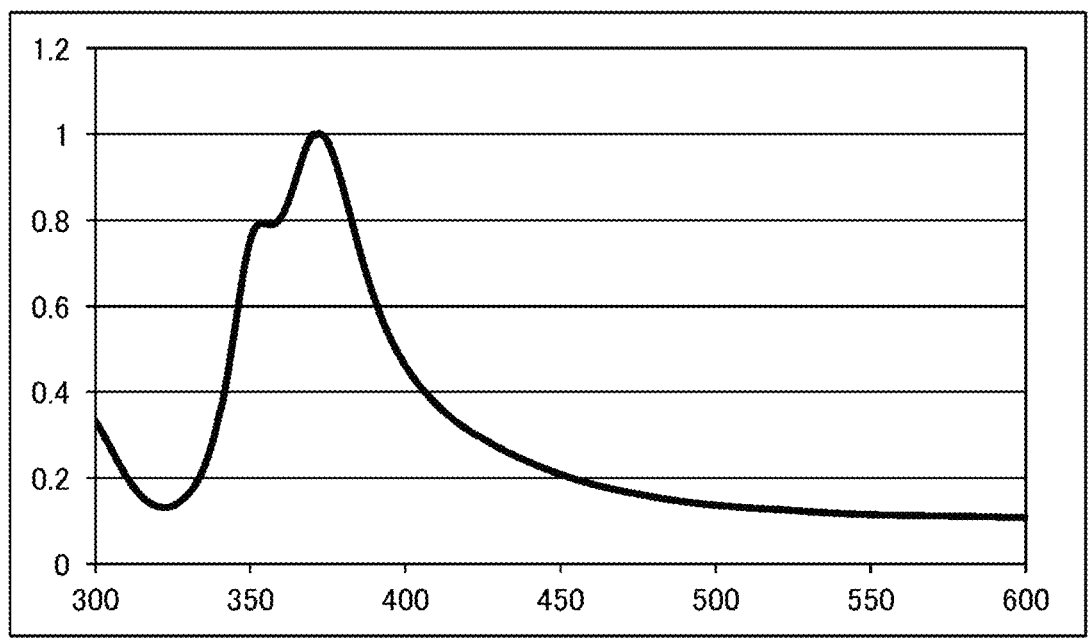
FIG. 30 shows an ultraviolet and visible absorption spectrum of silver nanowires obtained by Example 10.

FIG. 30 shows ultraviolet and visible absorption spectrum of the obtained silver nanowires. The Abs(λ450)/Abs(λmax) obtained from the spectrum of FIG. 30 was 0.21.

Comparative Example 1

Silver nanowires were synthesized and washed by the same operation as Example 1, except that all of the silver nitrate solution (second solution) was charged in the flask in one minute, instead of being provided for 2.5 hours by dropping (the number of moles of supplied silver nitrate: 0.087 mmol/min).

In this case, the molar ratio (metal salt/ionic derivative) calculated from the total number of moles of the halogen atoms of the ionic derivative (0.40 mmol) and the number of moles of the silver atoms of the silver nitrate supplied per minute (13 mmol), was 33.3.

Figure 31:
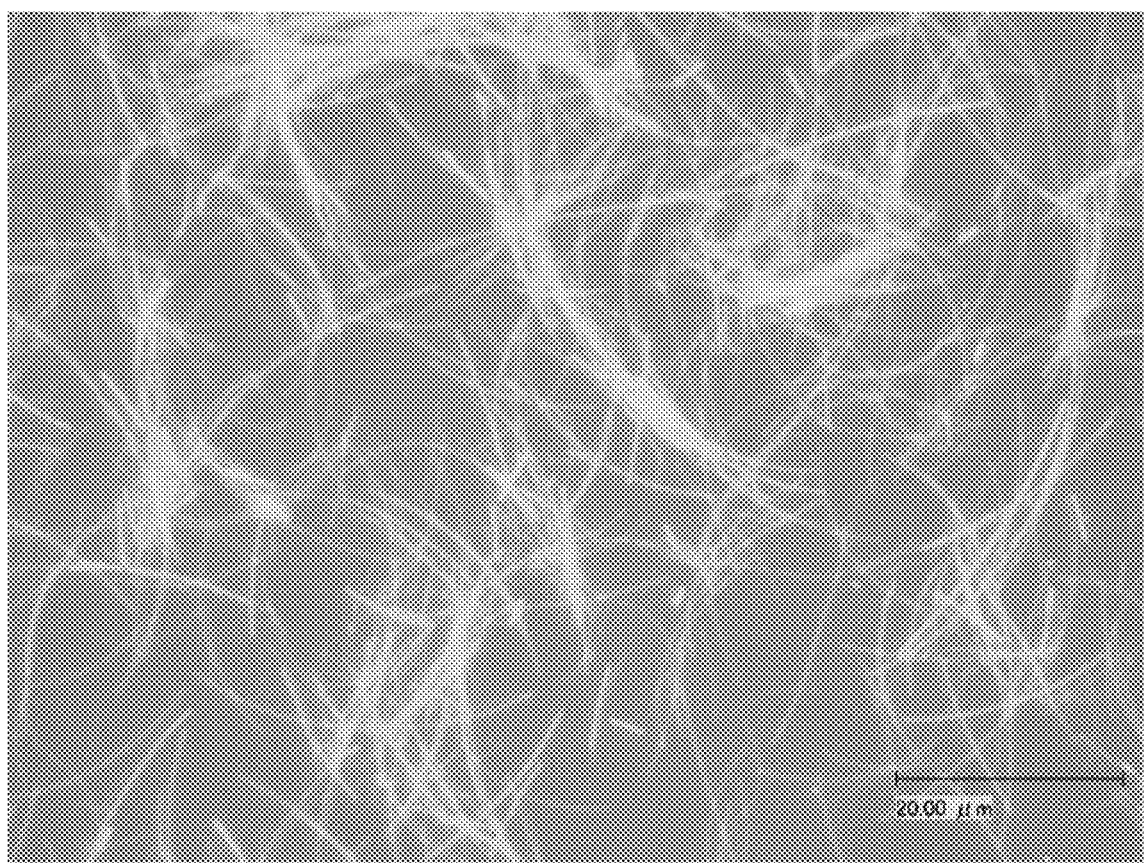
FIG. 31 shows an optical microscope image of silver nanowires obtained by Comparative Example 1.
Figure 32:
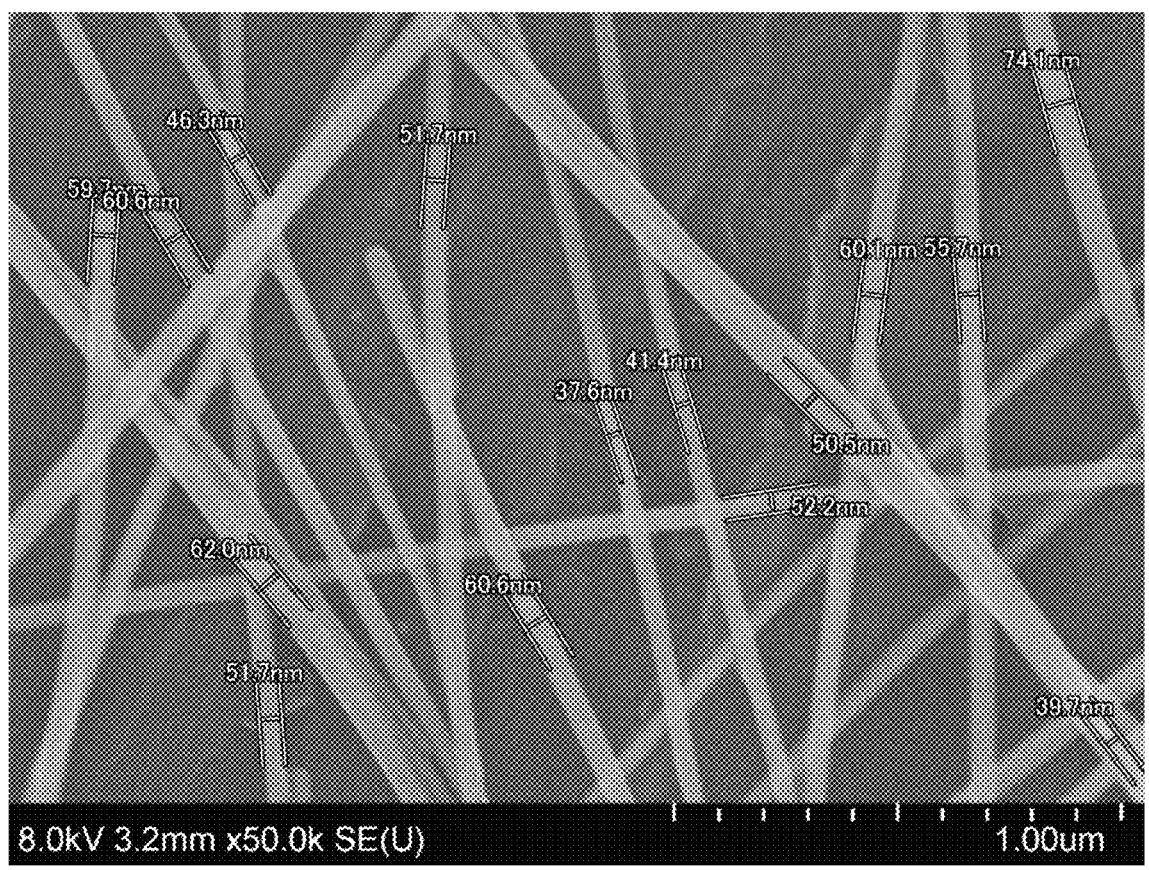
FIG. 32 shows a Field-Emission Scanning Electron Microscope (FE-SEM) image of silver nanowires obtained by Comparative Example 1.

FIG. 31 shows an optical microscope image of the obtained silver nanowires. The diameters and the lengths of the obtained silver nanowires were obtained by the above-mentioned method using the Field-Emission Scanning Electron Microscope (FE-SEM) image (FIG. 32), and the average diameter was 52.8 nm and the average length was 11.5 µm.

Figure 33:
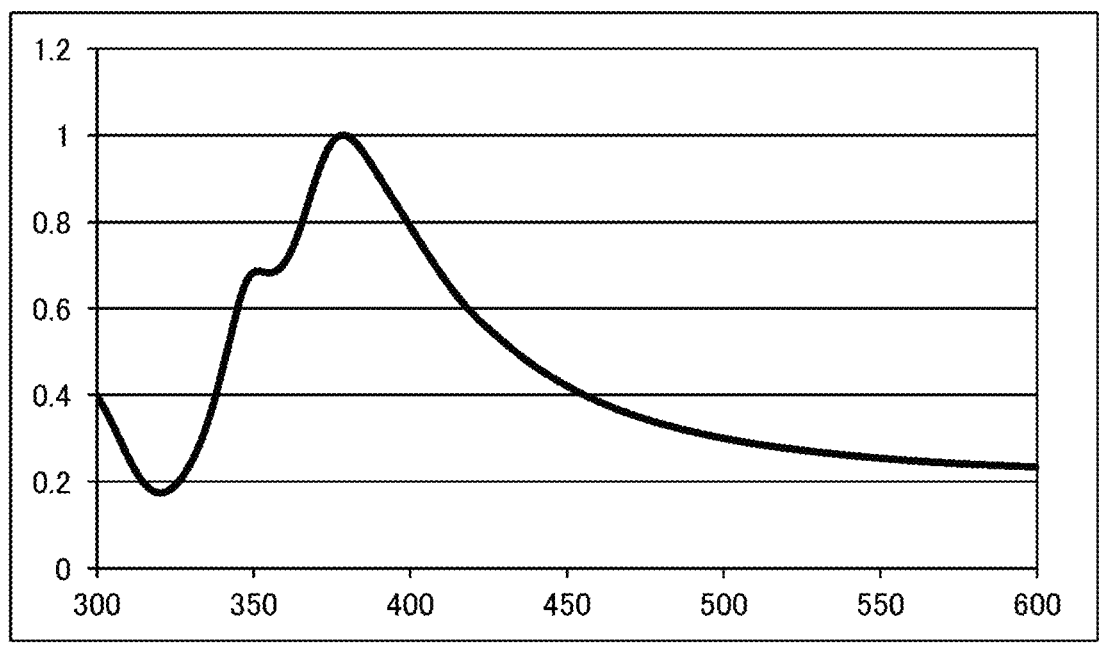
FIG. 33 an ultraviolet and visible absorption spectrum of silver nanowires obtained by Comparative Example 1.

FIG. 33 shows ultraviolet and visible absorption spectrum of the obtained silver nanowires. The Abs(λ450)/Abs(λmax) obtained from the spectrum of FIG. 33 was 0.42.

In Comparative Example 1, the average diameter was larger and the average length was shorter, compared to Examples 1 to 10. In addition, the Abs(λ450)/Abs(λmax) value reveals that a large number of spherical particles were generated. These occurred because the ratio of metal salt/ionic derivative at the time of synthesizing silver nanowires was larger than 10.

Comparative Example 2

The silver nitrate solution (second solution) was prepared in the way that 100 g of propylene glycol (manufactured by Wako Pure Chemical Industries, Ltd.) was weighed and charged in a 200 mL glass container and stirred with a stirrer, and therewhile, 7.2 g of polyvinylpyrrolidone K-90 (PVP) (manufactured by Wako Pure Chemical Industries, Ltd., weight average molecular weight: 350,000), i.e., a structure-directing agent, was added thereto and stirred for 3 hours at the temperature of 60° C. to dissolve the same completely. The resultant liquid was allowed to cool to a room temperature, and thereafter, 2.3 g (13 mmol) of silver nitrate (manufactured by Toyo Chemical Industrial Co., Ltd.), i.e., a metal salt, was added and stirred for 2 hours at a room temperature.

Further, in another step, all of the silver nitrate solution (second solution) was charged in the flask in one minute, instead of being provided for 2.5 hours by dropping (the number of moles of supplied silver nitrate: 0.087 mmol/min). Silver nanowires were synthesized and washed by the same operation as Example 7, except for the above. In this case, the molar ratio (metal salt/ionic derivative) calculated from the total number of moles of the halogen atoms of the ionic derivative (0.40 mmol) and the number of moles of the silver (metal) atoms of the silver nitrate (metal salt) supplied per minute (13 mmol), was 33.3.

Figure 34:
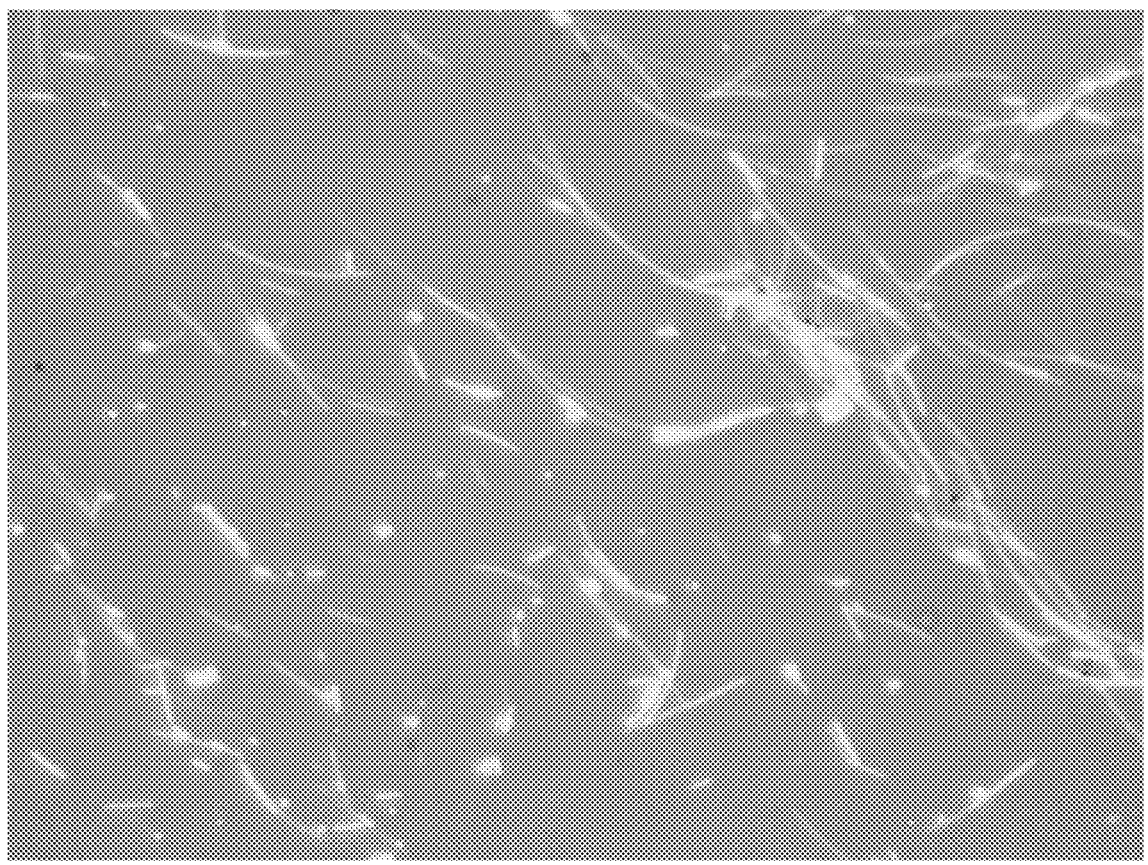
FIG. 34 an optical microscope image of silver nanowires obtained by Comparative Example 2.
Figure 35:
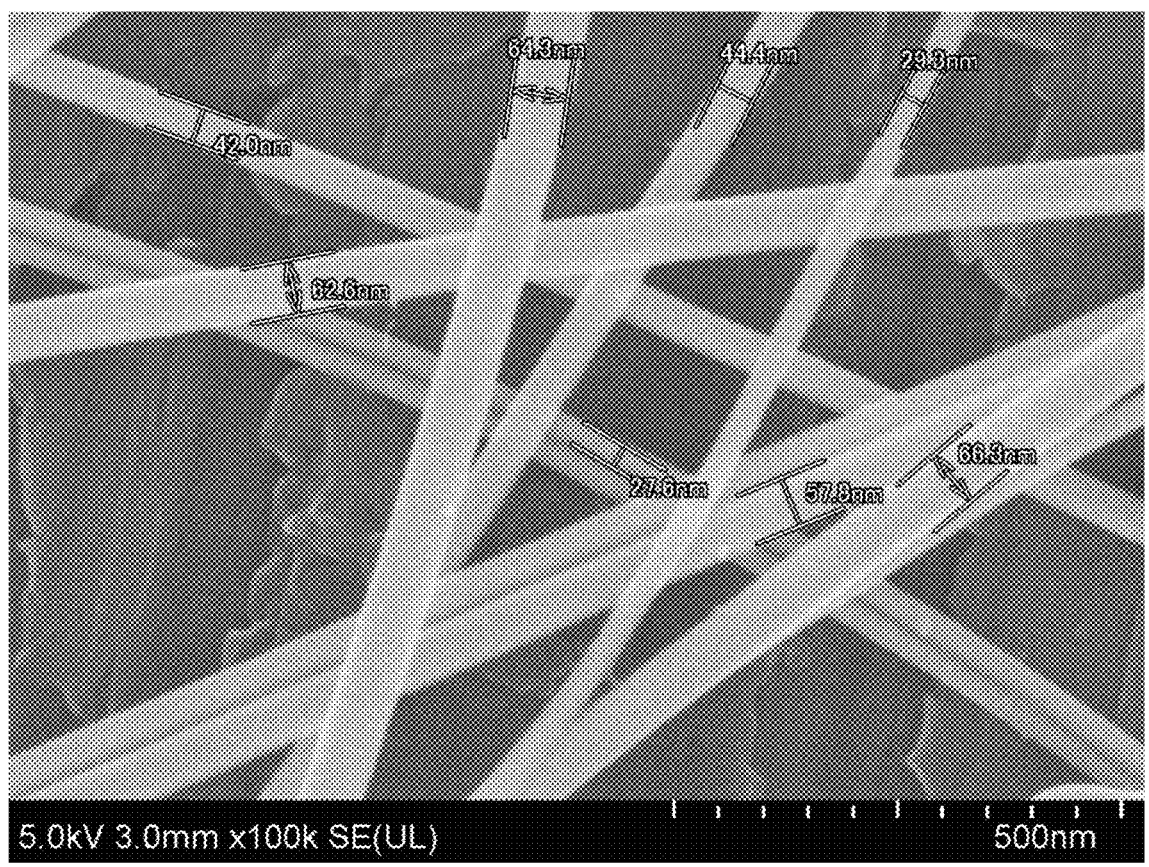
FIG. 35 shows a Field-Emission Scanning Electron Microscope (FE-SEM) image of silver nanowires obtained by Comparative Example 2.

FIG. 34 shows an optical microscope image of the obtained silver nanowires. The diameters and the lengths of the obtained silver nanowires were obtained by the above-mentioned method using the Field-Emission Scanning Electron Microscope (FE-SEM) image (FIG. 35), and the average diameter was 49.8 nm and the average length was 12.9 µm.

Figure 36:
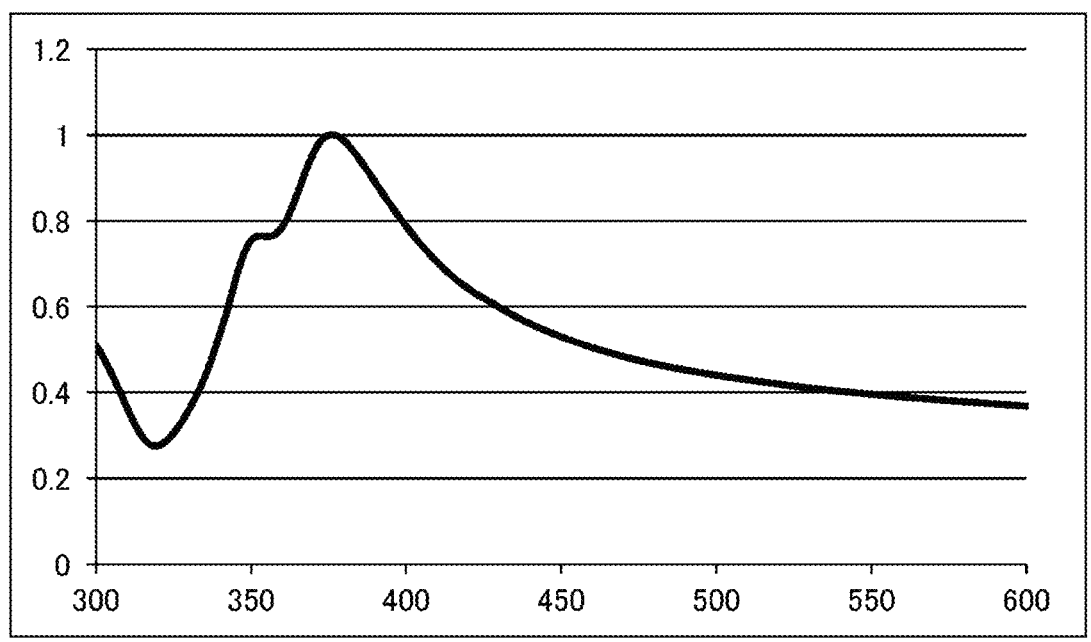
FIG. 36 an ultraviolet and visible absorption spectrum of silver nanowires obtained by Comparative Example 2.

FIG. 36 shows ultraviolet and visible absorption spectrum of the obtained silver nanowires. The Abs(λ450)/Abs(λmax) obtained from the spectrum of FIG. 36 was 0.53.

In Comparative Example 2, the average diameter was larger and the average length was shorter, compared to Examples 1 to 10. In addition, the Abs(λ450)/Abs(λmax) value reveals that a large number of spherical particles were generated. These occurred because the ratio of metal salt/ionic derivative at the time of synthesizing silver nanowires was larger than 10.

Table 1 shows synthesizing conditions of Examples 1 to 10 and Comparative Examples 1, 2. Table 2 shows evaluation results.

TABLE 1

| | First Solution | | | | | | | | Second Solution |
|---|---|---|---|---|---|---|---|---|---|
| | Kind of 1st Ionic Derivative | 1st Ionic Derivative Halogen Atomic Weight (mmol) | Kind of 2nd Ionic Derivative | 2nd Ionic Derivative Halogen Atomic Weight (mmol) | Kind of 1st Structurer-directing Agent | Amount of 1st Structurer-directing Agent (g) | Kind of 2nd Structurer-directing Agent | Amount of 2nd Structurer-directing Agent (g) | Kind of Metal Salt |
| Example 1 | tetraethyl ammonium chloride | 0.32 | sodium bromide | 0.08 | PVP | 7.2 | | | silver nitrate |
| Example 2 | tetraethyl ammonium chloride | 0.32 | sodium bromide | 0.08 | PVP | 3.6 | PVP-vinyl acetate | 3.6 | silver nitrate |
| Example 3 | ferric chloride | 0.33 | sodium bromide | 0.08 | PVP | 7.2 | | | silver nitrate |
| Example 4 | tetramethyl ammonium chloride | 0.32 | sodium bromide | 0.08 | PVP | 7.2 | | | silver nitrate |
| Example 5 | tetraethyl ammonium chloride | 0.32 | tetraethyl ammonium bromide | 0.08 | PVP | 7.2 | | | silver nitrate |
| Example 6 | tetraethyl ammonium chloride | 0.40 | | | PVP | 7.2 | | | silver nitrate |
| Example 7 | tetraethyl ammonium chloride | 0.32 | sodium bromide | 0.08 | | | | | silver nitrate |
| Example 8 | tetraethyl ammonium chloride | 0.32 | sodium bromide | 0.08 | | | | | silver nitrate |
| Example 9 | tetraethyl ammonium chloride | 0.32 | sodium bromide | 0.08 | PVP | 3.6 | | | silver nitrate |
| Example 10 | tetraethyl ammonium chloride | 0.32 | sodium bromide | 0.08 | PVP | 3.6 | PVP-vinyl acetate | 3.6 | silver nitrate |

TABLE 1-continued

| | | | | | | | | |
|---|---|---|---|---|---|---|---|---|
| Comparative Example 1 | tetraethyl ammonium chloride | 0.32 | sodium bromide | 0.08 | PVP | 7.2 | | silver nitrate |
| Comparative Example 2 | tetraethyl ammonium chloride | 0.32 | sodium bromide | 0.08 | | | | silver nitrate |

| | Second Solution | | | | | | Molar Ratio in Reaction | |
|---|---|---|---|---|---|---|---|---|
| | Metal Salt Atomic Weight (mmol) | Kind of 1st Structurer-directing Agent | Amount of 1st Structurer-directing Agent (g) | Kind of 2nd Structurer-directing Agent | Amount of 2nd Structurer-directing Agent (g) | Addition Method | Molar Ratio (metal salt/ionic derivative) | Liq. (no. of moles of metal atoms of metal salt/total no. of moles of halogen atoms of ionic derivative) |
| Example 1 | 13 | | | | | 2.5-hr drop | 0.22 | 0.2-6.7 |
| Example 2 | 13 | | | | | 2.5-hr drop | 0.22 | 0.2-6.7 |
| Example 3 | 13 | | | | | 2.5-hr drop | 0.21 | 0.4-8.1 |
| Example 4 | 13 | | | | | 2.5-hr drop | 0.22 | 0.2-6.0 |
| Example 5 | 13 | | | | | 2.5-hr drop | 0.22 | 0.2-7.0 |
| Example 6 | 13 | | | | | 2.5-hr drop | 0.22 | 0.2-5.8 |
| Example 7 | 13 | PVP | 7.2 | | | 2.5-hr drop | 0.22 | 0.2-7.1 |
| Example 8 | 13 | PVP | 3.6 | PVP-vinyl acetate | 3.6 | 2.5-hr drop | 0.22 | 0.14-6.7 |
| Example 9 | 13 | PVP | 3.6 | | | 4-hr drop | 0.14 | 0.13-7.1 |
| Example 10 | 13 | PVP | 3.6 | PVP-vinyl acetate | 3.6 | 4-hr drop | 0.14 | 0.14-8.3 |
| Comparative Example 1 | 13 | | | | | All in 1 min | 33.3 | |
| Comparative Example 2 | 13 | PVP | 7.2 | | | All in 1 min | 33.3 | |

TABLE 2

| | Average Diameter (nm) | Average Length (μm) | Abs(λ450)/Abs(λmax) |
|---|---|---|---|
| Example 1 | 36.3 | 25.5 | 0.21 |
| Example 2 | 41.4 | 26.9 | 0.23 |
| Example 3 | 34.6 | 19.6 | 0.18 |
| Example 4 | 34.4 | 20.8 | 0.21 |
| Example 5 | 33.2 | 27.7 | 0.21 |
| Example 6 | 42.4 | 18.9 | 0.29 |
| Example 7 | 37.3 | 22.7 | 0.21 |
| Example 8 | 32.0 | 18.3 | 0.21 |
| Example 9 | 38.5 | 19.8 | 0.24 |
| Example 10 | 33.2 | 16.5 | 0.21 |
| Comparative Example 1 | 52.8 | 11.5 | 0.42 |
| Comparative Example 2 | 49.8 | 12.9 | 0.53 |

The invention claimed is:

1. A method for producing metal nanowires comprising:

maintaining a first solution containing an ionic derivative at 80 to 200° C.; and supplying a second solution containing a metal salt to the first solution in a way so that a molar ratio between a total number of moles of halogen atoms of the ionic derivative in the first solution and a number of moles of metal atoms of the metal salt supplied per minute (number of moles of metal atoms of the metal salt supplied per minute/total number of moles of halogen atoms of the ionic derivative) is 0.22 or less, and a molar ratio in the first solution between a total number of moles of halogen atoms of the ionic derivative and the number of moles of metal atoms of the metal salt (number of moles of metal atoms of the metal salt/total number of moles of halogen atoms in the ionic derivative) is less than 10;

wherein the first solution and/or the second solution contains a polyol as a solvent, and the polyol is a 2- to 6-valent alcohol compound having 2 to 6 carbon atoms, and the polyol includes at least one of ethylene glycol and propylene glycol.

2. A method for producing metal nanowires according to claim 1, wherein, as a structure-directing agent, a (co) polymer containing a monomer unit derived from N-vinylpyrrolidone is provided in at least either the first solution or the second solution.

3. A method for producing metal nanowires according to claim 1, wherein the molar ratio between a total number of moles of halogen atoms of the ionic derivative in the first solution and a number of moles of metal atoms of the metal salt supplied per minute (number of moles of metal atoms of the metal salt supplied per minute/total number of moles of halogen atoms of the ionic derivative) is 0.01 or more.

4. A method for producing metal nanowires according to claim 1, wherein the ionic derivative is a compound from which halogen ions are dissociated when the compound is dissolved in a solvent.

5. A method for producing metal nanowires according to claim 4, wherein the compound from which halogen ions are dissociated comprises a compound from which chloride ions are dissociated.

6. A method for producing metal nanowires according to claim 1, wherein the ionic derivative comprises a compound from which chloride ions are dissociated as well as at least one of a compound from which bromide ions are dissociated and a compound from which iodide ions are dissociated, and supposing that (A) represents a total number of moles of chlorine atoms in the compound from which chloride ions are dissociated, and (B) represents a total number of moles of bromine atoms in the compound from which bromide ions are dissociated and iodine atoms in a compound from which iodide ions are dissociated, a molar ratio (A)/(B) is 2 to 8.

7. A method for producing metal nanowires according to claim 1, wherein the ionic derivative is either a quaternary ammonium halide or a metal halide.

8. A method for producing metal nanowires according to claim 7, wherein the quaternary ammonium halide is an alkyl quaternary ammonium halide having total 4 to 20 carbon atoms in a molecule (four alkyl groups are bound to a nitrogen atom of a quaternary ammonium salt, the alkyl groups being the same or different from each other).

9. A method for producing metal nanowires according to claim 7, wherein the quaternary ammonium halide is at least one of tetramethylammonium chloride, tetramethylammonium bromide, tetraethylammonium chloride, tetraethylammonium bromide, tetrapropylammonium chloride, tetrapropylammonium bromide, tetrabutylammonium chloride, tetrabutylammonium bromide, octyltrimethylammonium chloride, and octyltrimethylammonium bromide.

10. A method for producing metal nanowires according to claim 7, wherein the metal halide is at least one of alkali metal halides, alkali earth metal halides, and halides of metals in groups 3 to 12 of the long-period periodic table.

11. A method for producing metal nanowires according to claim 1, wherein the metal salt is at least one of silver nitrate ($AgNO_3$), silver hexafluorophosphate ($AgPF_6$), silver tetrafluoroborate ($AgBF_4$), silver perchlorate ($AgClO_4$), silver chlorate ($AgClO_3$), silver chloride (AgCl), silver bromide (AgBr), silver fluoride (AgF), silver carbonate ($Ag_2CO_3$), silver sulfate ($Ag_2SO_4$), silver acetate ($CH_3COOAg$), and silver trifluoroacetate ($CF_3COOAg$).

12. A method for producing metal nanowires according to claim 1, wherein a concentration of the metal salt in the second solution is 0.1 to 2.0 mol/L.

13. A method for producing metal nanowires according to claim 1, wherein a total amount of the polyol is 10,000 to 100,000 parts by mass relative to 100 parts by mass of the metal salt.

14. A method for producing metal nanowires according to claim 1, wherein the first solution and/or the second solution contains only ethylene glycol or propylene glycol as the solvent.

15. A method for producing metal nanowires according to claim 1, wherein the polyol is at least one of ethylene glycol or propylene glycol.

16. A method for producing metal nanowires according to claim 1, wherein the polyol is propylene glycol.

17. A method for producing metal nanowires according to claim 1, wherein the molar ratio between a total number of moles of halogen atoms of the ionic derivative in the first solution and a number of moles of metal atoms of the metal salt supplied per minute is 0.14 or less.

* * * * *